(12) United States Patent
Miyazaki

(10) Patent No.: US 9,082,351 B2
(45) Date of Patent: Jul. 14, 2015

(54) METHOD OF DRIVING ELECTROPHORETIC DISPLAY APPARATUS, ELECTROPHORETIC DISPLAY APPARATUS, AND ELECTRONIC DEVICE

(75) Inventor: Atsushi Miyazaki, Suwa (JP)

(73) Assignee: Seiko Epson Corporation (JP)

( * ) Notice: Subject to any disclaimer, the term of this patent is extended or adjusted under 35 U.S.C. 154(b) by 823 days.

(21) Appl. No.: 12/692,822

(22) Filed: Jan. 25, 2010

(65) Prior Publication Data

US 2010/0201657 A1 Aug. 12, 2010

(30) Foreign Application Priority Data

Feb. 6, 2009 (JP) ................................. 2009-026392
Aug. 28, 2009 (JP) ................................. 2009-198110

(51) Int. Cl.
*G09G 3/34* (2006.01)
*G02F 1/167* (2006.01)
*G06F 1/32* (2006.01)
*G06F 3/14* (2006.01)
*G09G 5/36* (2006.01)

(52) U.S. Cl.
CPC ............... *G09G 3/344* (2013.01); *G02F 1/167* (2013.01); *G06F 1/32* (2013.01); *G06F 1/3265* (2013.01); *G06F 3/14* (2013.01); *G09G 5/363* (2013.01); *G09G 2300/0426* (2013.01); *G09G 2300/0847* (2013.01); *G09G 2310/04* (2013.01); *G09G 2310/06* (2013.01); *G09G 2330/023* (2013.01); *G09G 2380/14* (2013.01); *Y02B 60/1242* (2013.01)

(58) Field of Classification Search
CPC .............. G09G 3/344; G09G 2310/04; G09G 2320/041
USPC ................. 345/107, 204, 208, 212–214, 205; 359/296, 228, 620
See application file for complete search history.

(56) References Cited

U.S. PATENT DOCUMENTS

| | | | |
|---|---|---|---|
| 2003/0043096 A1* | 3/2003 | Heie | 345/87 |
| 2003/0067666 A1 | 4/2003 | Kawai | |
| 2006/0092124 A1* | 5/2006 | Zhou et al. | 345/107 |
| 2007/0075962 A1 | 4/2007 | Zhou et al. | |
| 2008/0100566 A1 | 5/2008 | Miyasaka et al. | |
| 2008/0238867 A1* | 10/2008 | Maeda et al. | 345/107 |

(Continued)

FOREIGN PATENT DOCUMENTS

| | | |
|---|---|---|
| JP | 52-70791 | 6/1977 |
| JP | 2003-140199 | 5/2003 |
| JP | 2007-501436 | 1/2007 |

(Continued)

*Primary Examiner* — William Boddie
*Assistant Examiner* — Saifeldin Elnafia
(74) *Attorney, Agent, or Firm* — Harness, Dickey & Pierce, P.L.C.

(57) ABSTRACT

A method of driving an electrophoretic display apparatus, wherein during displaying an image on the display unit, executing a pixel electrode pulse driving in which a pulse periodically alternating between first and second potentials is input to the pixel electrode corresponding to the pixel of which a display state is changed, the first or second potential is input to the pixel electrode corresponding to the pixel of which a display state is not to be changed, and a potential equal to that of the pixel electrode corresponding to the pixel of which a display state is not to be changed is input to the common electrode.

12 Claims, 16 Drawing Sheets

(56) References Cited

U.S. PATENT DOCUMENTS

2008/0277279 A1  11/2008  Hirayama et al.
2009/0058798 A1  3/2009  Miyazaki

FOREIGN PATENT DOCUMENTS

| | | |
|---|---|---|
| JP | 2007-187936 | 7/2007 |
| JP | 2007-187938 | 7/2007 |
| JP | 2008-139739 A | 6/2008 |
| JP | 2008-164862 A | 7/2008 |
| JP | 2008-268853 | 11/2008 |
| JP | 2009-20285 | 1/2009 |
| JP | 2009-58801 | 3/2009 |
| WO | WO2004-104977 | 12/2004 |

\* cited by examiner

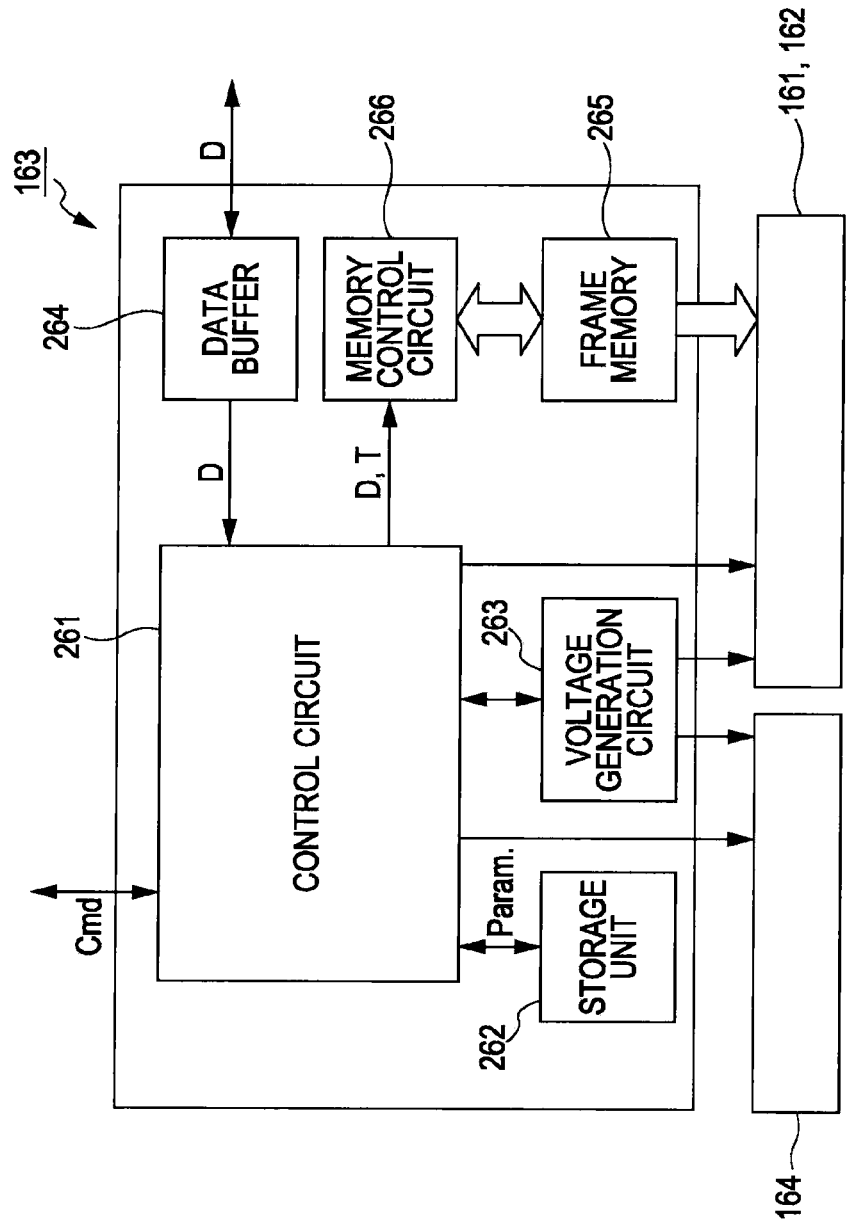

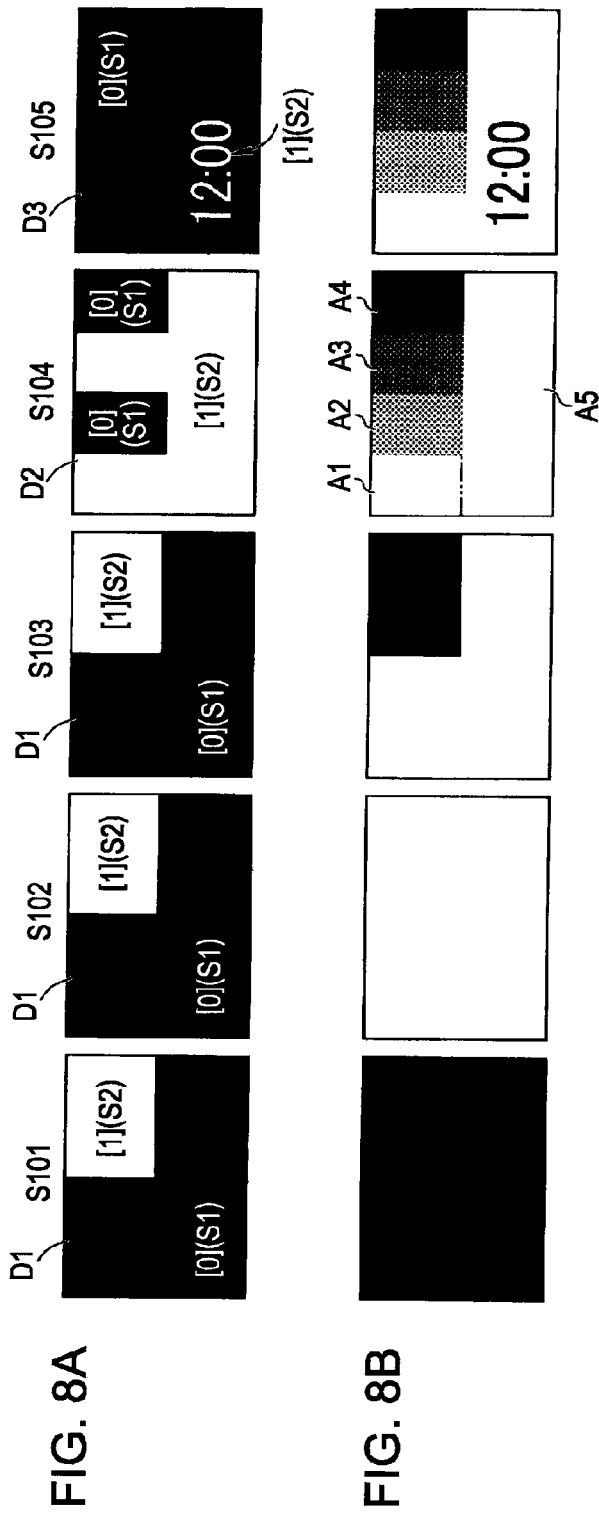
FIG. 8A
FIG. 8B
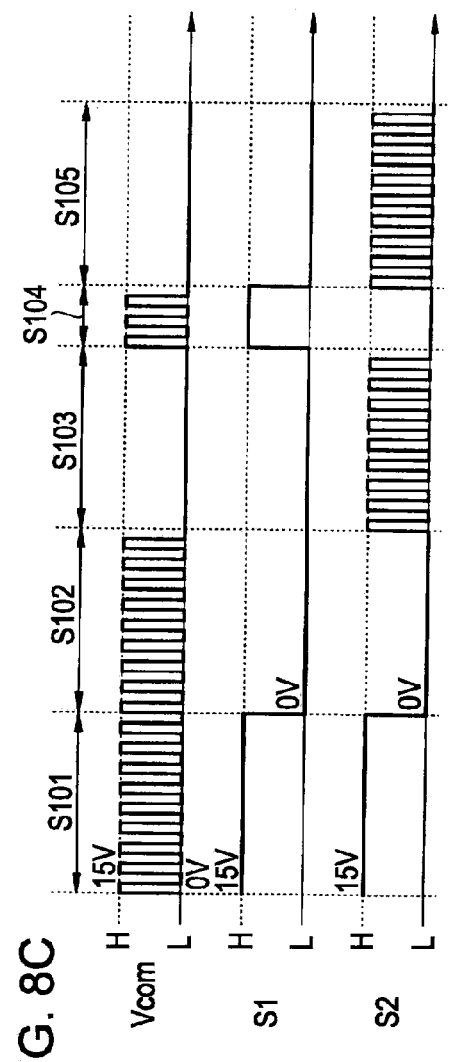
FIG. 8C

METHOD OF DRIVING ELECTROPHORETIC DISPLAY APPARATUS, ELECTROPHORETIC DISPLAY APPARATUS, AND ELECTRONIC DEVICE

BACKGROUND

1. Technical Field

The present invention relates to a method of driving an electrophoretic display apparatus, an electrophoretic display apparatus, and an electronic device.

2. Related Art

A phenomenon in which electrophoretic particles migrate due to the Coulomb force when an electric field is applied to a dispersion liquid obtained by dispersing electrophoretic particles in a solution (so called electrophoresis) is known in the art. Electrophoretic display apparatuses using this phenomenon are being developed. For example, such electrophoretic display apparatuses are disclosed in JP-A-52-70791 and JPA-2003-140199.

An electrophoretic display apparatus becomes able to change a display color into a desired color by generating a potential difference between a common electrode and a plurality of separated pixels. Meanwhile, as disclosed in JP-A-52-70791, a technique of maintaining a displayed color as it is without changing the display state at all by controlling a pixel potential such that a potential difference is not generated between the common electrode and the pixel electrodes was also proposed.

In the driving method disclosed in JP-A-52-70791, a driving method (a so called common shake driving) in which a pulse periodically alternating between low and high levels is input to the common electrode was employed. When only a part of segments are to be rewritten, a constant potential corresponding to a display color is input to the pixel electrodes of the pixels of which display states are rewritten, and a pulse having the same phase and potential as those of the common electrode in synchronization is input to the pixel electrodes of the pixels of which display states are not rewritten.

However, in this driving method, the potentials of the wiring connected to the segment electrode and the common electrode as well as the segment electrode and the common electrode are also periodically alternated between low and high levels. This makes the electrodes or the wiring be forcibly charged/discharged and increases current consumption in the segment of which a display state is not changed. As a result, even when a display state of only a part of the segments is rewritten, power consumption is inevitably increases.

SUMMARY

An advantage of some aspects of the invention is to provide a method of driving an electrophoretic display apparatus and an electrophoretic display apparatus capable of reducing power consumption when a display state is maintained.

According to an aspect of the invention, there is provided a method of driving an electrophoretic display apparatus including a display unit obtained by interposing an electrophoretic element containing electrophoretic particles between first and second substrates and arranging a plurality of pixels, pixel electrodes which are formed in the electrophoretic element side of the first substrate in association with each of the pixels, and a common electrode which is formed in the electrophoretic element side of the second substrate and opposite to a plurality of the first electrodes, the method including displaying an image on the display unit, wherein the displaying the image on the display unit includes a pixel electrode pulse driving in which a pulse periodically alternating between first and second potentials is input to the pixel electrode corresponding to the pixel of which a display state is changed, the first or second potential is input to the pixel electrode corresponding to the pixel of which a display state is not to be changed, and a potential equal to that of the pixel electrode corresponding to the pixel of which a display state is not to be changed is input to the common electrode.

In this driving method, since the pixel electrode corresponding to the pixel of which a display state is not to be changed and the common electrode have the same potential, the pixel of which a display state is not changed consumes nearly zero power. Therefore, according to the present embodiment of the invention, it is possible to address a problem relating to power consumption in the driving method of the related art and to provide a method of driving an electrophoretic display apparatus having an excellent power-saving capability.

The displaying the image on the display unit may include a common electrode pulse driving in which the first or second potential corresponding to a display color after updating is input to the pixel electrode, and a pulse periodically alternating between the first and second potentials is input to the common electrode.

In this driving method, when an image is displayed, the pixel electrode pulse driving or the common electrode pulse driving can be selected according to usage. Therefore, it is possible to more effectively reduce power consumption.

It is preferable that the pixel electrode pulse driving or the common electrode pulse driving is selected based on a ratio of the pixels of which a display state is updated.

It is advantageous to select the pixel electrode pulse driving from the viewpoint of power consumption in the pixels of which display states are not updated or a display quality. However, when most of the pixels of the display unit are updated, power consumption is more reduced by driving the common electrode using a pulse. At this point, it is possible to more effectively reduce power consumption by selecting the driving mode based on a ratio of the pixels of which display states are updated.

It is preferable that the pixel electrode pulse driving is selected when the ratio of the pixels of which display states are updated is 50% or less of all the pixels.

In this driving method, it is possible to reduce power consumption by more effectively using the pixel electrode pulse driving.

It is preferable that the electrophoretic display apparatus includes a coordinate input device for executing input with a pointing device, and the pixel electrode pulse driving is selected when a locus of the pointing device is displayed.

That is, if a coordinate input device such as a touch panel is installed, it is preferable that the pixel electrode pulse driving is used when the locus of the pointing device is displayed on the electrophoretic display apparatus. Since the locus of the pointing device is typically a line drawing having a narrow line width, only a part of the display unit is updated when the locus is displayed. In this case, it is possible to effectively reduce power consumption by selecting the pixel electrode pulse driving.

It is preferable that the common electrode pulse driving is executed only when the ratio of the pixels of which display states are updated is 100%.

In this driving method, it is possible to simplify the control process relating to the switching of a driving mode. It is also possible to provide an inexpensive electrophoretic display apparatus.

It is preferable that first and second control lines connected to each pixel are formed in the display unit, and each pixel includes a pixel switching element, a latch circuit connected to the pixel switching element, and a switch circuit connected to an output terminal of the latch circuit and the first and second control lines. It is preferable that in the pixel electrode pulse driving, a pulse periodically alternating between the first and second potentials is input to the first or second control line connected to the pixel electrode corresponding to the pixel of which a display state is changed, and the first or second potential equal to a potential of the common electrode is input to the first or second control line connected to the pixel electrode corresponding to the pixel which maintains a display state.

In this driving method, even in an active matrix type electrophoretic display apparatus, it is possible to reduce power consumption in the pixels of which display states are not updated.

It is preferable that first and second control lines connected to each pixel are formed in the display unit, each pixel includes a pixel switching element, a latch circuit connected to the pixel switching element, and a switch circuit connected to two output terminals of the latch circuit and the first and second control lines, and in the common electrode pulse driving, the first or second potential corresponding to a display color after updating is input to the first and second control lines.

In this driving mode, it is possible to reduce power consumption in the pixel of which a display state is not updated even in an active matrix type electrophoretic display apparatus.

According to another aspect of the invention, there is provided an electrophoretic display apparatus comprising: a display unit obtained by interposing an electrophoretic element containing electrophoretic particles between first and second substrates and arranging a plurality of pixels; pixel electrodes that are formed in the electrophoretic element side of the first substrate in association with each of the pixels; a common electrode that is formed in the electrophoretic element side of the second substrate and opposite to a plurality of the first electrodes; and a control unit that controls potentials input to the pixel electrodes and the common electrode, wherein, when an image is displayed on the display unit, the control unit executes a pixel electrode pulse driving in which a pulse periodically alternating between first and second potentials is input to the pixel electrode corresponding to the pixel of which a display state is changed, the first or second potential is input to the pixel electrode corresponding to the pixel of which a display state is not to be changed, and a potential equal to that of the pixel electrode corresponding to the pixel of which a display state is not to be changed is input to the common electrode.

In this construction, since the pixel electrode and the common electrode have the same potential in the pixel of which a display state is not changed, the pixels of which display states are not changed consumes nearly zero power. Therefore, it is possible to address the problem of power consumption in the driving method of the related art. It is possible to implement an electrophoretic display apparatus having an excellent power-saving capability.

It is preferable that, when an image is displayed on the display unit, the control unit executes a common electrode pulse driving in which the first or second potential corresponding to a display color after updating is input to the pixel electrode, and a pulse periodically alternating between the first and second potentials is input to the common electrode.

In this construction, when the image is displayed, the pixel electrode pulse driving operation or the common electrode pulse driving operation can be selected depending on usage. It is possible to more effectively reduce power consumption.

It is preferable that first and second control lines connected to each pixel are formed in the display unit, and each pixel includes a pixel switching element, a latch circuit connected to the pixel switching element, and a switch circuit connected to two output terminals of the latch circuit and the first and second control lines, wherein in the pixel electrode pulse driving, the control unit inputs a pulse periodically alternating between the first and second potentials to the first or second control line connected to the pixel electrode corresponding to the pixel of which a display state is changed and inputs the first or second potential equal to a potential of the common electrode to the first or second control line connected to the pixel electrode corresponding to the pixel which maintains a display state.

In this construction, it is possible to reduce power consumption in the pixel of which a display state is not updated. It is possible to provide an active matrix type electrophoretic display apparatus having an excellent power-saving capability.

It is preferable that first and second control lines connected to each pixel are formed in the display unit, and each pixel includes a pixel switching element, a latch circuit connected to the pixel switching element, and a switch circuit connected to two output terminals of the latch circuit and the first and second control lines, wherein in the common electrode pulse driving, the control unit inputs the first or second potential corresponding to a display color after updating to the first and second control lines.

In this construction, it is possible to reduce power consumption in the pixel of which a display state is not updated. It is possible to provide an active matrix type electrophoretic display apparatus having an excellent power-saving capability.

It is preferable that the electrophoretic display apparatus further includes a coordinate input device for executing an input operation using a pointing device, wherein the control unit is operated to display a locus of the pointing device on the display unit using the pixel electrode pulse driving.

That is, if the coordinate input device such as a touch panel is installed, it is preferable that the pixel electrode pulse driving operation is used when the locus of the pointing device is displayed on the electrophoretic display apparatus. Since the locus of the pointing device is typically a line drawing having a narrow line width, only a part of the display unit is update to display the locus. In this case, it is possible to effectively reduce power consumption by selecting the pixel electrode pulse driving operation.

According to still another aspect of the invention, there is provided an electronic device including the aforementioned electrophoretic display apparatus.

In this construction, it is possible to provide an electronic device including a display unit having an excellent power-saving capability.

BRIEF DESCRIPTION OF THE DRAWINGS

The invention will be described with reference to the accompanying drawings, wherein like numbers reference like elements.

FIG. 7 is a block diagram illustrating a controller in detail.

FIGS. 8A to 8C are diagrams for describing a method of driving an electrophoretic display apparatus according to a second embodiment of the invention.

DESCRIPTION OF EXEMPLARY EMBODIMENTS

Hereinafter, an electrophoretic display apparatus according to the invention will be described with reference to the accompanying drawings.

The scope of the invention is not limited to the embodiments which will be described later, but may be arbitrarily changed within the scope of the technical concept of the invention. In the following drawings, each component is scaled, or its numeric values are differently set from those of an actual configuration in order to facilitate understanding thereof.

Embodiment 1

Figure 1:
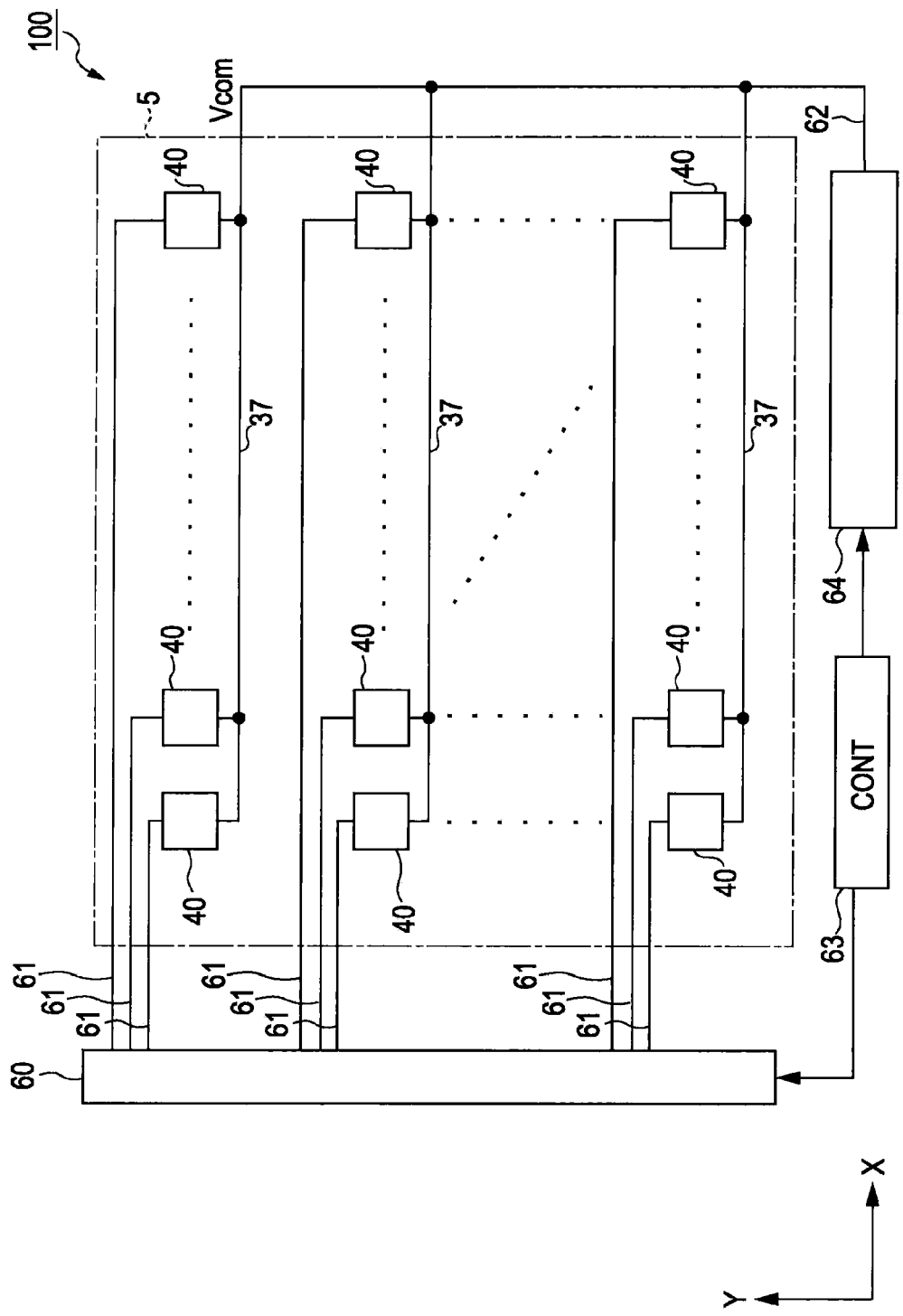
FIG. 1 is a schematic diagram illustrating an electrophoretic display apparatus according to a first embodiment of the invention.
Figure 2A:
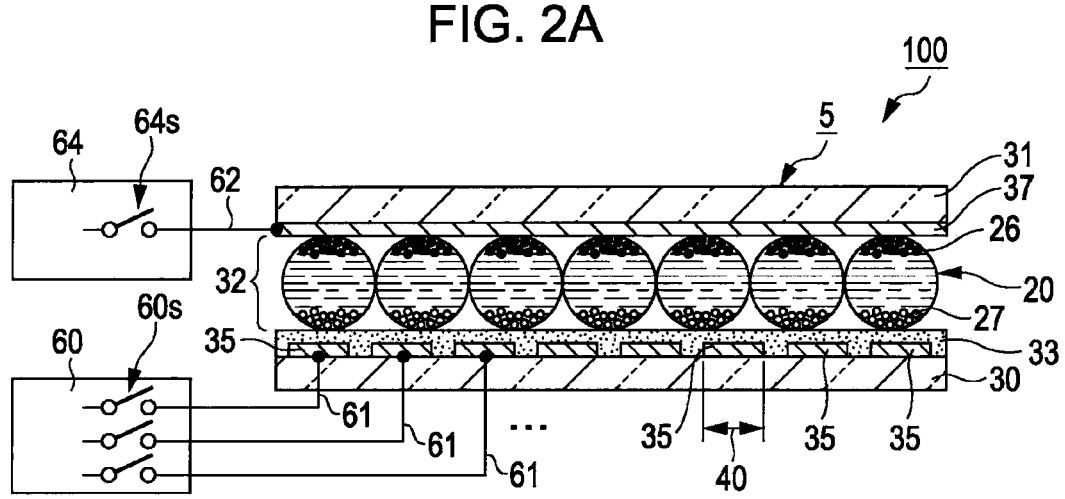
FIGS. 2A and 2B illustrate cross-sections of main components of an electrophoretic display apparatus.

FIG. 1 is a schematic diagram illustrating an electrophoretic display apparatus 100 according to a first embodiment of the invention. FIG. 2A illustrates an electrical construction of the electrophoretic display apparatus 100 along with its cross-section.

The electrophoretic display apparatus 100 includes a display unit 5 in which a plurality of pixels (segments) 40 are disposed, a controller (control unit) 63, and a pixel electrode driving circuit 60 connected to the controller 63. The pixel electrode driving circuit 60 is connected to each of the pixels 40 via a pixel electrode wire line 61. The display unit 5 is provided with a common electrode 37 (refer to FIG. 2A) which is common to each of the pixels 40. In FIG. 1, the common electrode 37 is illustrated as a wire line for convenience.

The electrophoretic display apparatus 100 is a segment driving type electrophoretic display apparatus in which image data are transmitted from the controller 63 to the pixel electrode driving circuit 60 and potentials generated based on these image data are directly input to each of the pixels 40.

Referring to FIG. 2A, the display unit 5 of the electrophoretic display apparatus 100 has electrophoretic elements 32 interposed between first and second substrates 30 and 31. A plurality of pixel electrodes (also, referred to as a segment electrode or a first electrode) 35 are formed in the electrophoretic element 32 side of the first substrate 30, and a common electrode (also, referred to as a second electrode) 37 is formed in the electrophoretic element 32 side of the second substrate 31. In the electrophoretic element 32, a plurality of microcapsules 20 obtained by encapsulating electrophoretic particles inside are arranged in a plane. The electrophoretic display apparatus 100 displays images formed by the electrophoretic elements 32 in the common electrode 37 side.

The first substrate 30 is made of glass, plastic, or the like, and may be not transparent because it is disposed opposite to an image display surface. The pixel electrode 35 is formed by depositing a nickel plating and a gold plating in this order on a Cu (copper) film or may be formed of Al (aluminum), ITO (indium tin oxide), or the like.

The second substrate 31 is made of glass or plastic, or the like, and is transparent because it is disposed in the image display side. The common electrode 37 is a transparent electrode formed of MgAg (magnesium antigen), ITO (Indium Tin Oxide), IZO (a registered trademark; Indium Zinc Oxide), or the like.

The pixel electrode driving circuit 60 is connected to each of the pixel electrodes 35 via the pixel electrode wire line 61. The pixel electrode driving circuit 60 is provided with switching elements 60s corresponding to each of the pixel electrode wire lines 61 and performs electrical input and cutoff (to make high impedance) operations for the potentials of the pixel electrodes 35 in response to the operation of the switching elements 60s.

Meanwhile, the common electrode 37 is connected to the common electrode driving circuit 64 via the common electrode wire line 62. The common electrode driving circuit 64 is provided with a switching element 64s connected to the common electrode wire line 62, and performs electrical input and cutoff (to make high impedance) operations for the potential of the common electrode 37 in response to the operation of the switching element 64s.

In general, the electrophoretic elements 32 are treated as an electrophoretic sheet which is previously formed in the second substrate 31 side and includes an adhesive layer 33. In the manufacturing process, the electrophoretic sheet is handled with a protection exfoliation sheet being attached on the surface of the adhesive layer 33. The display unit 5 is formed by attaching the electrophoretic sheet with the exfoliation sheet being removed to the first substrate 30 (having the pixel electrodes 35) that has been separately manufactured. Therefore, the adhesive layer 33 is provided only in the pixel electrode 35 side.

Figure 2B:
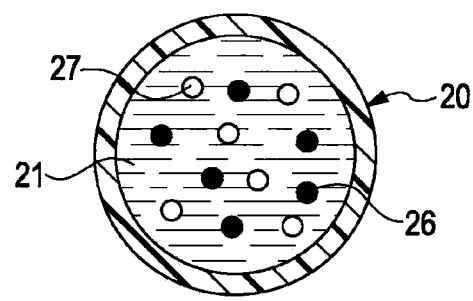

FIG. 2B is a schematic cross-sectional view illustrating a microcapsule 20. The microcapsule 20 has a grain diameter of about 30 to 50 μm and is a globular body obtained by encapsulating a dispersion medium 21, a plurality of white (electrophoretic) particles 27, and a plurality of black (electrophoretic) particles 26. As shown in FIG. 2A, the microcapsule 20 is interposed between the common electrode 37 and the pixel electrode 35, and one or more microcapsules 20 are disposed within a single pixel 40.

An outer envelope (a wall film) of the microcapsule 20 is formed of translucent polymer resin such as acrylic resin such as polymethyl methacrylate, polyethyl methacrylate, urea resin, or gum Arabic.

The dispersion medium 21 is a liquid for dispersing white and black particles 27 and 26 within the microcapsule 20. The dispersion medium 21 includes, for example, water, alcoholic solvent (such as methanol, ethanol, isopropanol, butanol, octanol, and methyl cellosolve), esters (such as ethyl acetate and butyl acetate), ketones (such as acetone, methyl-ethyl ketone, or methyl isobutyl ketone), aliphatic hydrocarbon (such as pentane, hexane, and octane), alicyclic hydrocarbon (such as cyclohexane and methyl cyclohexane), aromatic hydrocarbon (such as benzene, toluene, benzenes having a long-chain alkyl group (such as xylene, hexyl benzene, heptyl benzene, octyl benzene, nonyl benzene, decyl benzene, undecyl benzene, dodecyl benzene, tridecyl benzene, and tetradecyl benzene)), halogenated hydrocarbon (such as methylene chloride, chloroform, and carbon tetrachloride, 1,2-dichloroethane), or carboxylate. In addition, the dispersion medium 21 may include a petroleum material. These materials may be singly used or combined in a mixture. In addition, a surfactant may be mixed.

The white particle 27 is a particle (a polymer or a colloid) including a white pigment such as titanium dioxide, zinc oxide, and antimony trioxide and, for example, negatively charged. The black particle 26 is a particle (a polymer or a colloid) including a black pigment such as aniline black and carbon black and, for example, positively charged.

Depending on necessity, a charge control agent made of particles such as, electrolyte, a surfactant, a metal soap, resin, rubber, oil, varnish, and compound, a dispersion agent such as a titanium-based coupling agent, an aluminum-based coupling agent, and silane-based coupling agent, a lubricant agent, a stabilizing agent, or the like may be added to the pigment.

In addition, instead of the black and white particles 26 and 27, for example, a red, green, or blue pigment may be used. In this case, a red, green, or blue color can be displayed on the display unit 5.

Figure 3A:
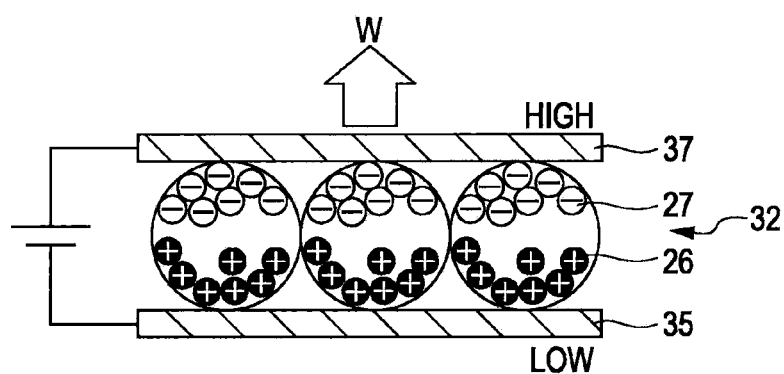
FIGS. 3A and 3B are diagrams for describing an operation of an electrophoretic element.
Figure 3B:
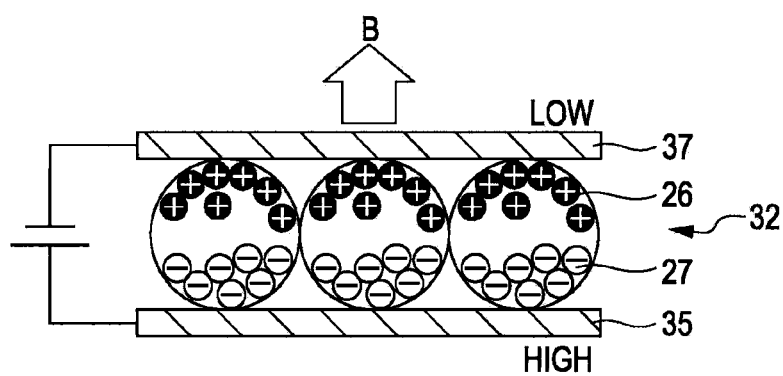

FIGS. 3A and 3B are diagrams for describing an operation of electrophoretic particles. FIG. 3A illustrates a case where the pixel 40 is displayed as a white color, and FIG. 3B illustrates a case where the pixel 40 is displayed as a black color.

In the case of the white display shown in FIG. 3A, the common electrode 37 is maintained in a relatively high potential, and the pixel electrode 35 is maintained in a relatively low potential. Therefore, while the negatively charged white particle 27 is attracted to the common electrode 37, the positively charged black particle 26 is attracted to the pixel electrode 35. As a result, when seen from the common electrode 37 side which functions as a display surface side, this pixel is recognized as a white color W.

In the case of the black display shown in FIG. 3B, the common electrode 37 is maintained in a relatively low potential, and the pixel electrode 35 is maintained in a relatively high potential. Therefore, while the positively charged black particle 26 is attracted to the common electrode 37, the negatively charged white particle 27 is attracted to the pixel electrode 35. As a result, when seen from the common electrode 37 side, this pixel is recognized as a black color B.

Driving Method

A method of driving an electrophoretic display apparatus having the aforementioned construction will now be described.

Figure 4A:
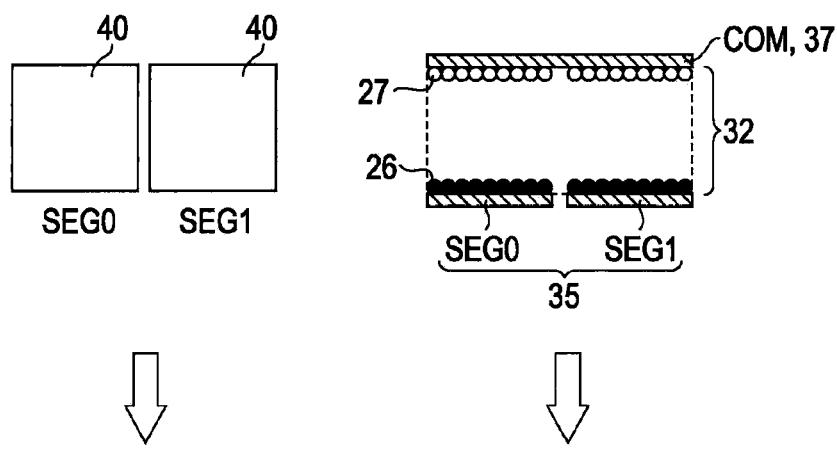
FIGS. 4A to 4C are diagrams for describing a method of driving an electrophoretic display apparatus according to a first embodiment of the invention.
Figure 4B:
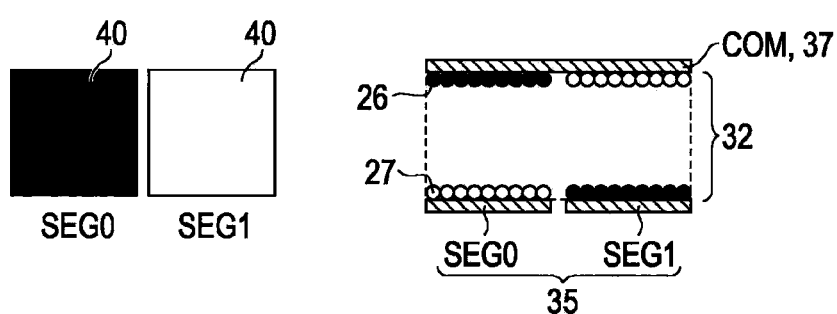
Figure 4C:
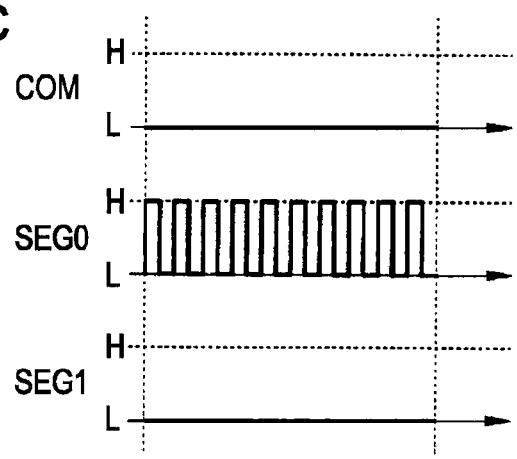

FIGS. 4A to 4C are diagrams for describing a method of driving an electrophoretic display apparatus according to a first embodiment of the invention. FIGS. 4A and 4B are a plan view (left side) and a cross-sectional view (right side), respectively, illustrating a state transition of the pixel 40 in the driving method which will be described later. FIG. 4C is a timing chart illustrating potentials input to the pixel electrode and the common electrode.

The first embodiment of the invention relates to a driving method for executing a black color display, as shown in FIG. 4B, for only the pixel 40 corresponding to the pixel electrode SEG0 (the pixel electrode 35) among two pixels 40 displaying a white color as shown in FIG. 4A.

In the white display pixels 40 shown in FIG. 4A, the black particles 26 are attracted to the pixel electrode SEG0 and SEG1 side, whereas the white particles 27 are attracted to the common electrode 37. As a driving method executed in this display state, it is possible to employ either a driving method of the invention, which will be described later, or a driving method of the related art. For example, it is possible to display a white color on both of the two pixels 40 by inputting a low-level potential (e.g., 0 V) to both the pixel electrodes SEG0 and SEG1 and inputting a pulse periodically alternating between a low level potential and a high-level potential (e.g., 15 V) to the common electrode COM (the common electrode 37).

In order to convert from the white color display state shown in FIG. 4A into the black and white color display state shown in FIG. 4B, a low-level potential (e.g., 0 V) is input to the common electrode COM as shown in FIG. 4C. Then, a pulse having a rectangular waveform periodically alternating between a low level (e.g., 0 V) and a high level (e.g., 15 V) is input to the pixel electrode SEG0, and a low-level potential is input to the pixel electrode SEG1.

Accordingly, whilst the pixel electrode SEG0 has a high level, the electrophoretic element 32 is driven by a potential difference between the pixel electrode SEG0 and the common electrode COM. As shown in FIG. 4B, the pixel 40 corresponding to the pixel electrode SEG0 displays a black color.

Meanwhile, since both the pixel electrode SEG1 and the common electrode COM have a low level, the display state of the pixel 40 corresponding to the pixel electrode SEG1 is not changed.

In a driving method according to a first embodiment of the invention described above, a pulse periodically alternating between high and low levels is input to the pixel electrode 35 corresponding to the pixel 40 of which a display state is updated among pixels 40 included in the display unit 5, and the same constant potential is input to the common electrode 37 and the pixel electrode 35 corresponding to the pixel 40 of which the display state is not to be changed.

In a driving method according to a first embodiment of the invention, since the common electrode 37 and the pixel electrode 35 of the pixel 40 of which a display state is not to be changed have the same constant potential, the pixel 40 of which the display state is not changed consumes nearly no power. Therefore, according to a first embodiment of the invention, it is possible to address the problem relating to power consumption in the driving method disclosed in JP-A-52-70791.

Furthermore, since a periodic pulse is input to the pixel electrode 35 corresponding to the pixel 40 of which a display state is changed, images are displayed as in a case where a periodic pulse is input to the common electrode 37 (i.e., a common shift driving). Therefore, it is possible to obtain a display quality as in the common shift driving.

Embodiment 2

In the foregoing first embodiment of the invention, a case where a driving method according to the invention is applied to a segment type electrophoretic display apparatus has been described. A second embodiment of the invention relates to a driving method applied to an active matrix type electrophoretic display apparatus, which will now be described in more detail.

Figure 5:
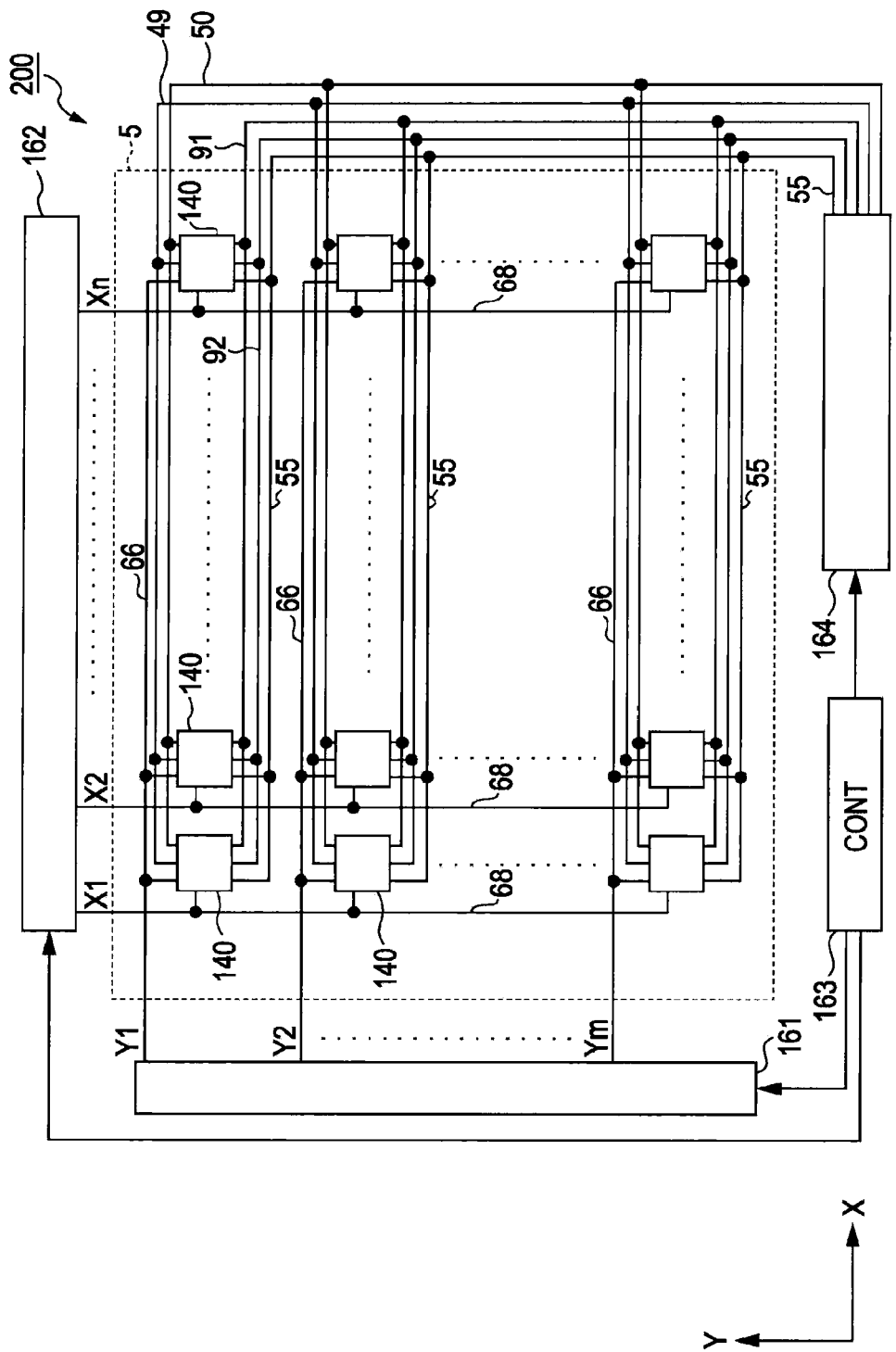
FIG. 5 is a schematic diagram illustrating an electrophoretic display apparatus according to a second embodiment of the invention.
Figure 6:
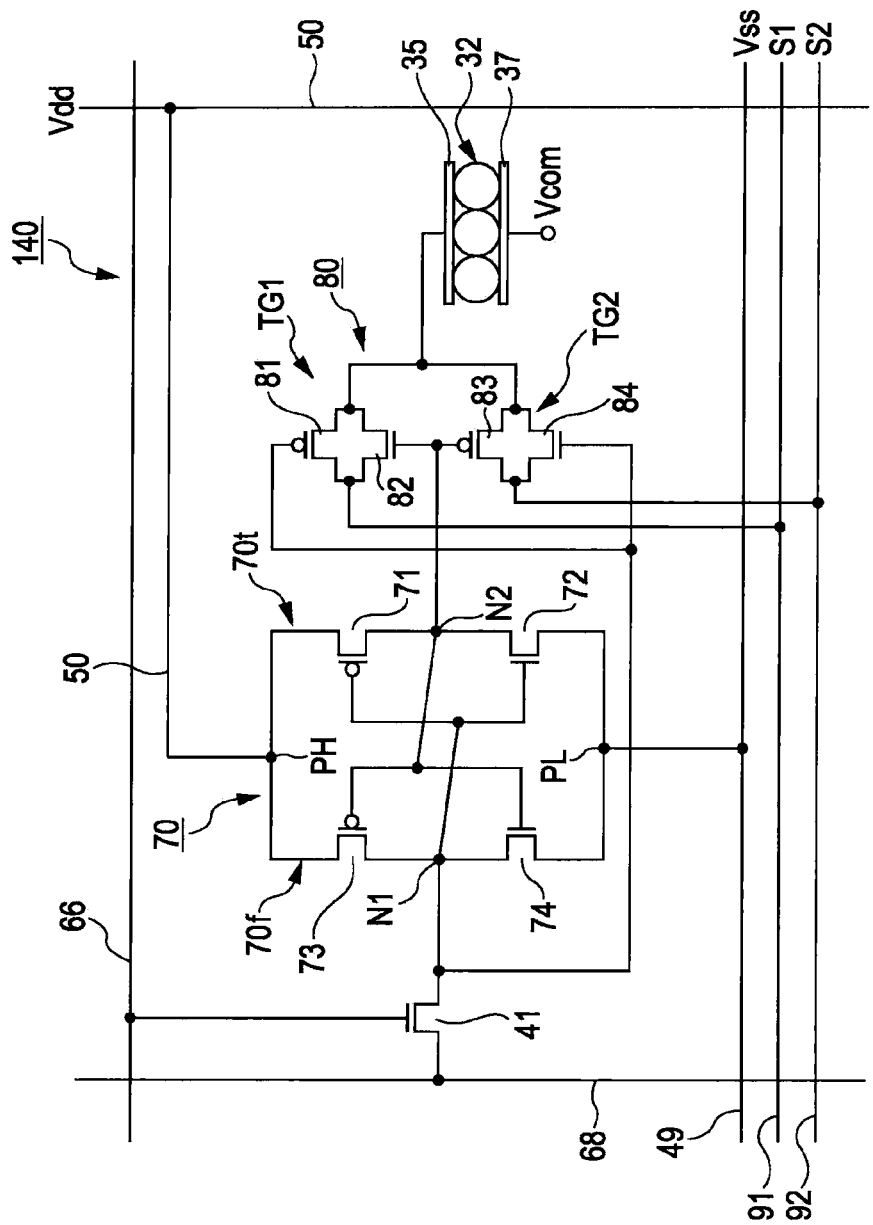
FIG. 6 illustrates a pixel circuit according to a second embodiment of the invention.

FIG. 5 illustrates a schematic construction of an electrophoretic display apparatus 200 according to a second embodiment of the invention. FIG. 6 illustrates a pixel circuit of an electrophoretic display apparatus 200 according to a second embodiment of the invention.

In FIGS. 5 and 6, like reference numerals denote like elements similar to those of the first embodiment, and their descriptions will be omitted.

Referring to FIG. 5, the electrophoretic display apparatus 200 includes a display unit 5 in which pixels 140 are arranged in a matrix shape, a scanning line driving circuit 161, a data line driving circuit 162, a controller (control unit) 163, and a common power modulation circuit 164. The controller 163 totally controls the electrophoretic display apparatus 200 based on a synchronization signal or image data supplied from an upper-level device.

The display unit 5 is provided with a plurality of scanning lines 66 extending from the scanning line driving circuit 161 and a plurality of data lines 68 extending from the data line driving circuit 162. They are connected to each pixel 140.

The display unit 5 is also provided with low potential power line 49, a high potential power line 50, a common electrode wire line 55, a first control line 91, and a second control line 92 extended from the common power modulation circuit 164. They are also connected to each pixel 140. The common power modulation circuit 64 generates various signals to be supplied to each of the aforementioned wire lines as well as performs electrical connection and cutoff (to make high impedance) operations for each of the wire lines under control of the controller 63.

The scanning line driving circuit 161 is connected to each pixel 140 via m scanning lines 66 (Y1, Y2, ..., Ym) and sequentially selects the scanning lines 66 from the first row to the m-th row under control of the controller 163 to supply a selection signal for specifying a turn-on timing of the selection transistor 41 (refer to FIG. 6) provided in the pixel 140 via the selected scanning line 66.

The data line driving circuit 162 is connected to each pixel 140 via n data lines 68 (X1, X2, ..., Xn) and supplies the pixel 140 with an image signal for specifying one-bit pixel data corresponding to each of the pixels 140 under control of the controller 163.

According to a second embodiment of the invention, a low level L of the image signal is supplied to the pixel 140 when the pixel data "0" is specified, and a high level H of the image signal is supplied to the pixel 140 when the pixel data "1" is specified.

As shown in FIG. 6, the pixel 140 is provided with a selection transistor 41 (also, referred to as a pixel switching element), a latch circuit 70 (also, referred to as a memory circuit), a switch circuit 80, an electrophoretic element 32, a pixel electrode 35, and a common electrode 37. Around these elements, the scanning line 66, the data line 68, the low potential power line 49, the high potential power line 50, the first control line 91, and the second control line 92 are disposed. The pixel 40 is an SRAM (Static Random Access Memory) type in which the image signal is stored by the latch circuit 70 as a potential.

The selection transistor 41 is an N-MOS (Negative Metal Oxide Semiconductor) transistor. A gate terminal of the selection transistor 41 is connected to the scanning line 66. A source terminal thereof is connected to the data line 68. A drain terminal thereof is connected to a data input terminal N1 of the latch circuit 70.

The data input terminal N1 and the data output terminal N2 of the latch circuit 70 are connected to the switch circuit 80. The switch circuit 80 is connected to the pixel electrode 35 as well as the first and second control lines 91 and 92. Electrophoretic elements 32 are interposed between the pixel electrode 35 and the common electrode 37.

The latch circuit 70 includes a transfer inverter 70t and a feedback inverter 70f. Both the transfer inverter 70t and the feedback inverter 70f are C-MOS inverters. The transfer inverter 70t and the feedback inverter 70f have a loop structure in which one of their output terminals is connected to an input terminal of the other one. A power voltage is supplied to each inverter from a high potential power line 50 connected via a high potential power terminal PH and a low potential power line 49 connected via a low potential power terminal PL.

The transfer inverter 70t includes an N-MOS transistor 72 and a P-MOS (Positive Metal Oxide Semiconductor) transistor 71 of which each drain terminal is connected to the data output terminal N2. The source terminal of the P-MOS transistor 71 is connected to the high potential power terminal PH, and the source terminal of the N-MOS transistor 72 is connected to the low potential power terminal PL. Gate terminals (i.e., the input terminal of the transfer inverter 70t) of the P-MOS and N-MOS transistors 71 and 72 are connected to the data input terminal N1 (i.e., the output terminal of the feedback inverter 70f).

The feedback inverter 70f includes an N-MOS transistor 74 and a P-MOS transistor 73 of which each drain terminal is connected to the data input terminal N1. The gate terminals (i.e., the input terminal of the feedback inverter 70f) of the P-MOS and N-MOS transistors 73 and 74 are connected to the data output terminal N2 (i.e., the output terminal of the transfer inverter 70t).

In the latch circuit 70 having the aforementioned construction, a low-level signal L is output from the data output terminal N2 of the latch circuit 70 when a high-level image signal H (corresponding to pixel data "1") is stored. Meanwhile, when a low-level image signal L (corresponding to pixel data "0") is stored in the latch circuit 70, a high-level signal H is output from the data output terminal N2.

The switch circuit 80 includes a first transmission gate TG1 and a second transmission gate TG2.

The first transmission gate TG1 has a P-MOS transistor 81 and an N-MOS transistor 82. Source terminals of the P-MOS and N-MOS transistors 81 and 82 are connected to the first control line 91, and drain terminals of the P-MOS and N-MOS transistors 81 and 82 are connected to the pixel electrode 35. A gate terminal of the P-MOS transistor 81 is connected to the data input terminal N1 of the latch circuit 70 (i.e., a drain terminal of the selection transistor 41), and a gate terminal of the N-MOS transistor 82 is connected to the data output terminal N2 of the latch circuit 70.

The second transmission gate TG2 has a P-MOS transistor 83 and an N-MOS transistor 84. Source terminals of the P-MOS and N-MOS transistors 83 and 84 are connected to the second control line 92, and drain terminals of the P-MOS and N-MOS transistors 83 and 84 are connected to the pixel electrode 35. A gate terminal of the P-MOS transistor 83 is connected to the data output terminal N2 of the latch circuit 70, and a gate terminal of the N-MOS transistor 84 is connected to the data input terminal N1 of the latch circuit 70.

When a low-level image signal L (corresponding to image data "0") is stored in the latch circuit 70, and a high-level signal H is output from the data output terminal N2, the first transmission gate TG1 is turned on, and the potential S1 supplied via the first control line 91 is input to the pixel electrode 35.

Meanwhile, when a high-level image signal H (corresponding to pixel data "1") is stored in the latch circuit 70, and a low-level signal L is output from the data output terminal N2, the second transmission gate TG2 is turned on, and the potential S2 supplied via the second control line 92 is input to the pixel electrode 35.

FIG. 7 is a block diagram illustrating details of the controller 163 included in the electrophoretic display apparatus 200.

The controller 163 includes a control circuit 261 as a CPU (Central Processing Unit), a storage unit 262, a voltage generation circuit 263, a data buffer 264, a frame memory 265, and a memory control circuit 266.

The control circuit 261 generates control signals (i.e., a timing pulse) such as a clock signal CLK, a horizontal synchronization signal Hsync, and a vertical synchronization signal Vsync and supplies these control signals to each circuit disposed around the control circuit 261. A control signal Cmd is input to the control circuit 261 from an upper-level device (not shown), and the control circuit 261 controls each circuit based on the control signal Cmd to execute various image display operations.

The storage unit 262 includes nonvolatile memory such as EEPROM (Electrically-Erasable and Programmable Read-Only Memory) and flash memory, and stores setup values (e.g., a mode setup value or a volume value) required to control operations of each circuit using the control circuit 261. For example, the storage unit 262 stores setup values of driving sequences of every operation mode as LUT (Lookup Table).

The storage unit 262 may also store preset image data used in operations of the electrophoretic display apparatus 200. For example, the storage unit 262 may store image data regarding a logo or warning used at the time of starting up the electrophoretic display apparatus 200.

The voltage generation circuit 263 is a circuit for supplying a driving voltage to the scanning line driving circuit 161, the data line driving circuit 162, and the common power modulation circuit 164.

The data buffer 264 is an interface with an upper-level device in the controller 163. Also, the data buffer 264 stores image data D regarding the display image input from an upper-level device as well as transmits image data D to the control circuit 261.

The frame memory 265 is freely writable/readable memory having a writable/readable memory space corresponding to an array of pixels 140 of the display unit 5. The memory control circuit 266 deploys the image data D supplied from the control circuit 261 according to a pixel array of the display unit 5 based on the control signal and writes the image data D on the frame memory 265. The frame memory 265 sequentially transmits a data group consisting of the stored image data D as an image signal to the data line driving circuit 162.

The data line driving circuit 162 latches the image signal transmitted from the frame memory 265 on a line-by-line basis based on the control signal supplied from the control circuit 261. The data line driving circuit 162 also supplies the latched image signal to the data line 68 in synchronization with the sequential selection operation of the scanning lines 66 performed by the scanning line driving circuit 161.

Driving Method

FIGS. 8A to 8C are diagrams for describing an image display operation based on a method of driving the electrophoretic display apparatus having the aforementioned construction. FIG. 8A conceptually illustrates the image data transmitted to the display unit 5. FIG. 8B illustrates a display state of the display unit 5 according to FIG. 8A. FIG. 8C is a timing chart illustrating potential states of the common electrode 37, the first control line 91, and the second control line 92 according to FIGS. 8A and 8B.

Figure 9:
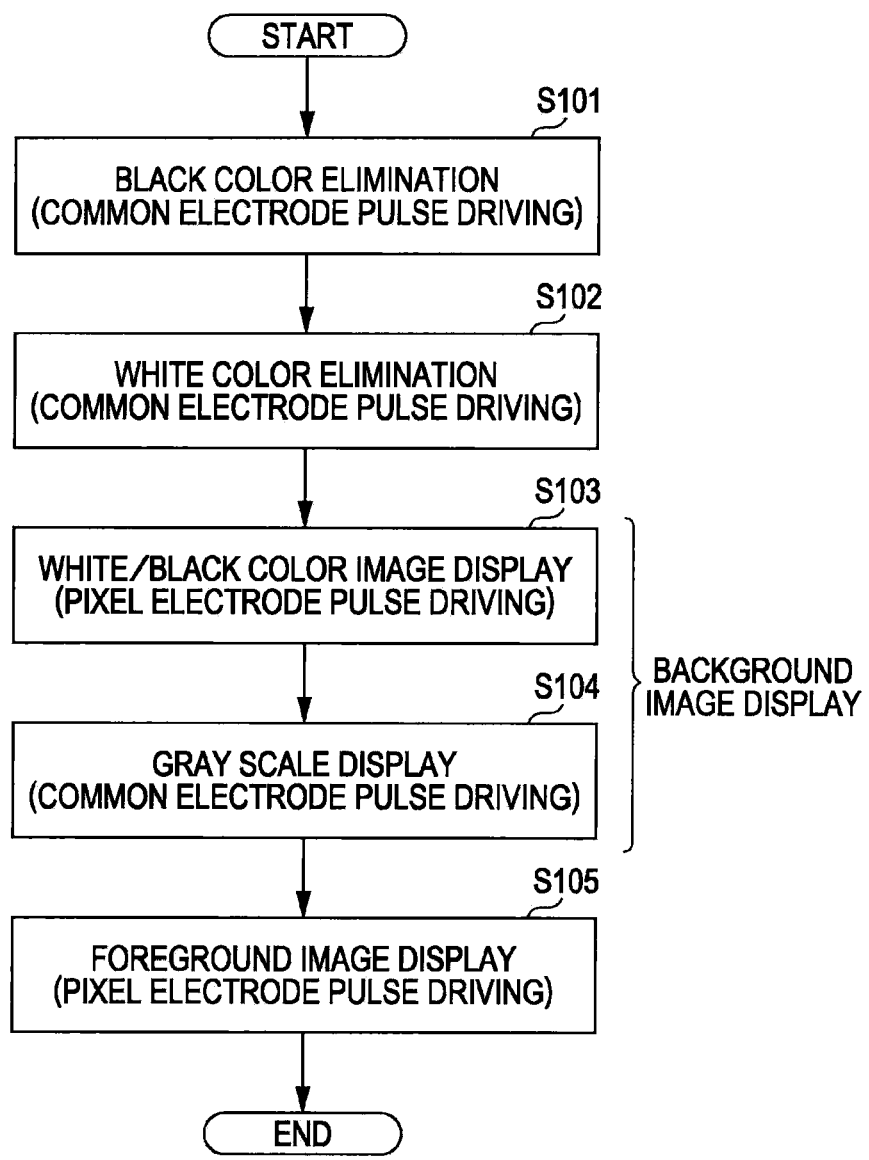
FIG. 9 is a flowchart corresponding to FIGS. 8A to 8C.

FIG. 9 is a flowchart including steps S101 to S105 shown in FIGS. 8A to 8C.

Referring to FIG. 9, a driving method according to a second embodiment of the invention includes a black color elimination step S101, a white color elimination step S102, a white/black image display step S103, a gray scale display step S104, and a foreground image display step S105.

The black color elimination step S101 and the white color elimination step S102 is to display a white or black color on the entire surface on the display unit 5 to eliminate an image of the previous frame. These elimination steps S101 and S102 may be executed or not depending on necessity. Alternatively, either of the black color elimination step S101 or the white color elimination step S102 may be executed. Furthermore, the black color elimination step S101 and the white color elimination step S102 may be alternately executed in several times.

The white/black image display step S103, the gray scale display step S104, and the foreground image display step S105 are to display an updated image on the display unit 5.

According to a second embodiment of the invention, as shown in FIG. 9, a background image including a gray scale is displayed by the black/white image display step S103 and the gray scale display step S104. In the foreground image display step S105, the updated image is displayed by superimposing the foreground image on part of the background image that has been already displayed.

The steps S103 to S105 are exemplary, and a second embodiment of the invention is not limited thereto. For example, if the background image is a monochrome image having only black and white colors, the gray scale display step S104 is dispensable. In addition, the foreground image display step S105 may include the black/white image display step and the gray scale display step to display a foreground image containing a gray scale.

Alternatively, the updated image may be displayed in a single layer without being separated into two layers, background and foreground layers. Alternatively, the updated image may be separated into three or more layers and sequentially displayed.

Hereinafter, a driving method according to a second embodiment of the invention will be described in detail with reference to FIGS. 8 to 10.

Black Color Elimination Step S101 (Common Electrode Pulse Driving)

First, in the black color elimination step S101, the image data D1 shown in FIG. 8A is input to the control circuit 261 via the data buffer 264. A control signal Cmd for displaying a black color on the entire surface of the display unit 5 in a common electrode pulse driving mode is input to the control circuit 261.

In the common electrode pulse driving mode, the electrophoretic element 32 is driven by inputting a pulse alternating between high and low levels to the common electrode 37 with the pixel electrode 35 being kept in a predetermined constant potential.

A portion displayed in black of the image data D1 (i.e., black color data) corresponds to the pixel data "0" (i.e., the low-level image signal L). Meanwhile, a portion displayed in white of the image data D1 (i.e., white color data) corresponds to the pixel data "1" (i.e., the high-level image data H).

The control circuit 261 transmits the input image data D1 to the memory control circuit 266. The memory control circuit 266 deploys the input image data D in a memory space of the frame memory 265. As a result, the image signal corresponding to the image data D is ready to be supplied to the data line driving circuit 162 from the frame memory 265.

Subsequently, the control circuit 261 transmits the control signal to the scanning line driving circuit 161 and the data line driving circuit 162. The scanning line driving circuit 161 inputs a pulse as a selection signal to the scanning line 66 based on the control signal. Meanwhile, the data line driving circuit 162 supplies the image signal supplied from the frame memory 265 to the selected pixel 140 in synchronization with the selection operation of the scanning line driving circuit 161.

As a result, the image data D1 shown in FIG. 9B is input to the pixel 140 of the display unit 5.

In the pixel 140 corresponding to the black color data of the image data D1, a low-level image signal L is stored in the latch circuit 70, and the first control line 91 and the pixel electrode 35 are connected via the transmission gate TG1 which is turned on by the output from the latch circuit 70.

Meanwhile, in the pixel 140 corresponding to the white color data of the image data D1, a high-level image signal H is stored in the latch circuit 70, and the second control line 92 and the pixel electrode 35 are connected via the transmission gate TG2.

Subsequently, the control circuit 261 outputs to the common power driving circuit 164 a control signal for driving the common electrode 37 using a pulse and setting the first and second control lines 91 and 92 to a predetermined equal potential.

The common power driving circuit 164 maintains a high level H (e.g., 15 V) in both the first and second control lines 91 and 92 (potentials S1 and S2) and inputs a rectangular waveform pulse periodically alternating between a high level H and a low level L (e.g., 0 V) to the common electrode 37 (at a potential Vcom) based on the received control signal as shown in FIG. 8C.

Accordingly, since the first and second control lines 91 and 92 and the pixel electrode 35 are connected to all the pixels 140 of the display unit 5, a high-level potential H is input from the first and second control lines 91 and 92 to the pixel electrodes 35 of all the pixels 140 irrespective of the potential stored in the latch circuit 70.

As a result, whilst the common electrode 37 has a low level L, the electrophoretic element 32 is driven by a potential difference generated between the pixel electrode 35 (a high level) and the common electrode 37. As a result, the black particles 26 are attracted to the common electrode 37, and the white particles 27 are attracted to the pixel electrode 35 (refer to FIGS. 3A and 3B) so that the black color is displayed on the entire surface of the display unit 5 as shown in FIG. 9B.

In the electrophoretic display apparatus 200 according to a second embodiment of the invention, since the pixel 140 includes a switch circuit 80 connected to the first and second control lines 91 and 92 as described above, the potential of the pixel electrode 35 can be directly controlled by controlling the potential of the first and second control lines 91 and 92. Therefore, it is possible to display a black color on the entire surface of the display unit 5 even when the image data D1 in which pixel data "0" and "1" are mixed are maintained in the display unit 5.

In the black color elimination step S101, since any kind of image data can be maintained in the display unit 5, the image data transmitted to the display unit 5 may not be the image data D1 shown in the drawing. For example, the image data may include only the black color data (corresponding to pixel data "0") or the white color data (corresponding to pixel data "1").

When image data are maintained in the display unit 5 at the beginning of the black color elimination step S101, it is unnecessary to transmit image data D1 to the display unit 5 as well as supply image data D1 to the controller 163. In this case, a black color is displayed on the entire surface of the display unit 5 just by handling the potentials of the first and second control lines 91 and 92 and driving the common electrode 37 using a pulse without transmitting image data D1.

White Color Elimination Step S102 (Common Electrode Pulse Driving)

Subsequently, when the white color elimination step S102 is executed, a control signal Cmd for displaying a white color on the entire surface of the display unit 5 in a common electrode pulse driving mode is input to the control circuit 261. The image data D1 input to the control circuit 261 via the data buffer 264 is similar to those of the black color elimination step S101.

Then, under control of the control circuit 261, the image data D1 is transmitted to the display unit 5.

Also in the white color elimination step S102, any kind of image data can be maintained in the display unit 5. Therefore, when the image data D1 transmitted in the black color elimination step S101 are still maintained in the display unit 5, it is unnecessary to transmit image data D1 as well as supply image data D1 to the controller 163.

Then, the control circuit 261 outputs to the common power driving circuit 164 a control signal for driving the common electrode 37 using a pulse and setting the first and second control lines 91 and 92 to a predetermined equal potential.

The common power driving circuit 164 maintains a low level in both the first and second control lines 91 and 92 and inputs a rectangular waveform pulse alternating between high and low levels to the common electrode 37 based on the received control signal as shown in FIG. 8C.

In all the pixels 140, if the potentials are input as described above, the potentials of the first and second control lines 91 and 92 are input to the pixel electrodes 35, and all of the pixel electrodes 35 have a low level. Whilst the common electrode 37 has a high level, the electrophoretic element 32 is driven by a potential difference generated between the pixel electrode 35 (e.g. a low level) and the common electrode 37. As a result, the white particles 27 are attracted to the common electrode 37 side, whereas the black particles 26 are attracted to the pixel electrode 35 side (refer to FIGS. 3A and 3B), so that a white color is displayed on the entire surface of the display unit 5 as shown in FIG. 9B.

Black/White Image Display Step S103 (Pixel Electrode Pulse Driving)

Subsequently, in the black/white image display step S103, the image data D1 shown in FIG. 8A is input to the control circuit 261 via the data buffer 264. A control signal Cmd including a command for operating the display unit 5 in a pixel electrode pulse driving mode is input to the control circuit 261.

Similar to that of the first embodiment of the invention, the pixel electrode pulse driving mode is to drive the electrophoretic element 32 by inputting a pulse alternating between high and low levels to the pixel electrode 35 whilst the common electrode is kept in a predetermined constant potential.

Then, under control of the control circuit 261, the image data D1 are transmitted to the display unit 5.

When the image data D1 transmitted to the display unit 5 in the black color elimination step S101 or the white color elimination step S102 are still maintained in the display unit 5, it is unnecessary to transmit the image data D1 as well as to supply image data D1 to the controller 163.

Subsequently, the control circuit 261 outputs to common power driving circuit 164 a control signal for setting the common electrode 37 and the first control line 91 to a predetermined equal potential and driving the second control line 92 using a pulse.

The common power driving circuit 164 maintains the common electrode 37 and the first control line 91 at a low level and inputs a pulse periodically alternating between high and low levels to the second control line 92 based on the received control signal as shown in FIG. 8C.

In the pixel 140 to which the black color data (corresponding to the pixel data "0") is input, a low-level potential is input to the pixel electrode 35 via the first control line 91 (at a potential S1). In such a pixel 140, since both the pixel electrode 35 and the common electrode 37 have a low level, the electrophoretic element 32 is not driven, and a white color is still displayed as shown in FIG. 9B.

Meanwhile, in the pixel 140 to which a white color data (corresponding to pixel data "1") is input, a pulse periodically alternating between high and low levels is input to the pixel electrode 35 via the second control line 92. Accordingly, the electrophoretic element 32 is driven by a potential difference between the common electrode 37 (having a low level) and the pixel electrode 35 whilst the pixel electrode 35 has a high level, so that the display state is changed from a white color to a black color as shown in FIG. 9B.

Through the black/white image display step S103 described above, a black color is written to a part of the display unit 5 that has displayed a white color on its entire surface. Then, the gray scale display step S104 is executed.

Gray Scale Display Step S104 (Common Electrode Pulse Driving)

Subsequently, in the gray scale display step S104, the image data D2 shown in FIG. 8A is input to the control circuit 261 via the data buffer 264. In addition, a control signal Cmd including a command for operating the display unit 5 in a common electrode pulse driving mode is input to the control signal 261. Then, under control of the control circuit 261, the image data D2 is transmitted to the display unit 5.

Then, the control circuit 261 outputs to the common power driving circuit 164 a control signal for inputting a predetermined potential to the first and second control lines 91 and 92 and driving the common electrode 37 using a pulse. The common power driving circuit 164 inputs a high-level potential to the first control line 91 and a low-level potential to the second control line 92, respectively, based on the received control signal as shown in FIG. 8C. Also, the common power driving circuit 164 inputs a pulse periodically alternating between high and low levels to the common electrode 37.

In the pixels 140 belonging to areas A2 and A4 of FIG. 8B to which black color data (corresponding to pixel data "0") is input, a high-level potential is input to the pixel electrode 35 via the first control line 91 (at a potential S1). Accordingly, the electrophoretic element 32 is driven by a potential difference generated between the pixel electrode 35 and the common electrode 37 whilst the common electrode 37 has a low level.

In this case, while the electrophoretic element 32 is operated to display a black color, as shown in FIG. 8C, the pixel 140 of the area A2 which originally displayed a white color does not display a black color but a light gray color because a voltage application period is short in the gray scale display step S104. Meanwhile, the display state of the pixel 140 of the area A4 which originally displayed a black color is not changed.

In the pixels 140 (of areas A1, A3, and A5) to which white color data (corresponding to pixel data "1") are input, a low-level potential is input to the pixel electrode 35 via the second control line 92. Accordingly, the electrophoretic element 32 is driven by a potential difference generated between the pixel electrode 35 and the common electrode 37 whilst the common electrode 37 has a low level.

In this case, while the electrophoretic element 32 is operated to display a white color, the pixel 140 of the area A3 which originally displayed a black color displays a dark gray color instead of a white color because the voltage application period of the gray scale display step S104 is short. Meanwhile, the display states of the pixels 140 of the areas A1 and A5 which originally displayed a white color are not changed.

Through the gray scale display step S104 described above, a part of areas (e.g., the area A3) which displayed a black color in the black/white image display step S103 displays a gray scale as a dark gray, whereas a part of areas (e.g., the area A2) which displayed a white color displays a gray scale as a light gray. As a result, a four-scale display including gray scales is implemented. Then, the foreground image display step S105 is executed.

Foreground Image Display Step S105 (Pixel Electrode Pulse Driving)

Subsequently, as the process advances to the foreground image display step S103, the image data D3 shown in FIG. 8A are input to the control circuit 261 via the data buffer 264. A control signal Cmd including a command for operating the display unit 5 in a pixel electrode pulse driving mode is input to the control circuit 261. Then, under control of the control circuit 261, the image data D3 are transmitted to the display unit 5.

Subsequently, the control circuit 261 outputs to the common power driving circuit 164 a control signal for setting the common electrode 37 and the first control line 91 to a predetermined equal potential and driving the second control line 92 using a pulse.

The common power driving circuit 164 maintains the common electrode 37 and the first control line 91 at a low level and inputs a pulse periodically alternating between high and low levels to the second control line 92 based on the received control signal as shown in FIG. 8C.

In the pixel 140 to which black color data (corresponding to pixel data "0") is input, a low-level potential is input to the pixel electrode 35 via the first control line 91 (having a potential S1). In such a pixel 140, since both the pixel electrode 35 and the common electrode 37 have a low level, the electrophoretic element 32 is not driven, but the display state including a gray scale of the gray scale display step S104 is maintained.

Meanwhile, in the pixel 140 (corresponding to a time display portion) to which white color data (corresponding to pixel data "1") is input, a pulse periodically alternating between high and low levels is input to the pixel electrode 35 via the second control line 92. Accordingly, the electrophoretic element 32 is driven by a potential difference generated between the common electrode 37 and the pixel electrode 35 whilst the pixel electrode 35 has a high level so that a time indication having a black color is displayed on a background having a white color.

Through the steps S101 to S105 described above, it is possible to display an image obtained by superimposing the foreground image indicating time with the background image including a gray scale on the display unit 5.

As described above, in the driving method according to a second embodiment of the invention, while the common electrode 37 and the first control line 91 are maintained at a low level, a pulse alternating between high and low levels is input to the second control line 92 during the black/white image display step S103 and the foreground image display step S105 for rewriting a part of the display unit 5.

As a result, it is possible to partially rewrite a desired portion by selectively driving only the electrophoretic element 32 of the pixel 140 to which the second control line 92 and the pixel electrodes 35 are connected (e.g., the white data pixel 140 receiving pixel data "1"). Since a voltage is intermittently applied to the electrophoretic element 32 when a display state is changed, it is possible to obtain the same display quality as those of other steps S101, S102, and S104 in which a common electrode pulse driving is executed.

Meanwhile, in the pixel 140 which is not rewritten, since the pixel electrode 35 and the common electrode 37 are maintained in the same potential, a voltage is not applied to the electrophoretic element 32, and power consumption can be nearly zero. In addition, it is possible to prevent the electrophoretic element 32 or the electrodes from being deteriorated when a display density is changed, or a balance of positive and negative currents is broken.

According to a second embodiment of the invention, in the black color elimination step S101, the white color elimination step S102, and the gray scale display step S104 in which the entire surface of the display unit 5 is rewritten, a common electrode pulse driving in which a pulse alternating between high and low levels is input to the common electrode 37 is executed.

As a result, it is possible to more reduce power consumption when the entire surface of the display unit 5 is rewritten in comparison with when the display unit 5 is operated in the pixel electrode pulse driving mode.

In the pixel electrode pulse driving mode, since a pulse alternating between high and low levels is input to the first or second control line 91 or 92, capacitors of the first and second control lines 91 and 92 which correspond to global wiring are charged and discharged. The first and second control lines 91 and 92 have a large capacity, about ten times that of the common electrode 37, because they are formed on the first substrate 30 in which a wiring layer is deposited, and other wire lines are adjacently disposed. Therefore, when the entire surface of the display unit 5 is rewritten, it is possible to more reduce power consumption by executing the common electrode pulse driving.

From the viewpoint of the wiring capacity, it is preferable to apply the pixel electrode pulse driving mode when 50% or less of pixels 140 of the display unit 5 are rewritten. According to the driving method described above, it is possible to reduce power consumption in both the partial rewriting and the overall rewriting and ensure a display quality.

Electronic Device

Hereinafter, a case where the electrophoretic display apparatuses according to the first and second embodiments of the invention are applied to an electronic device will be described.

Watch

Figure 10:
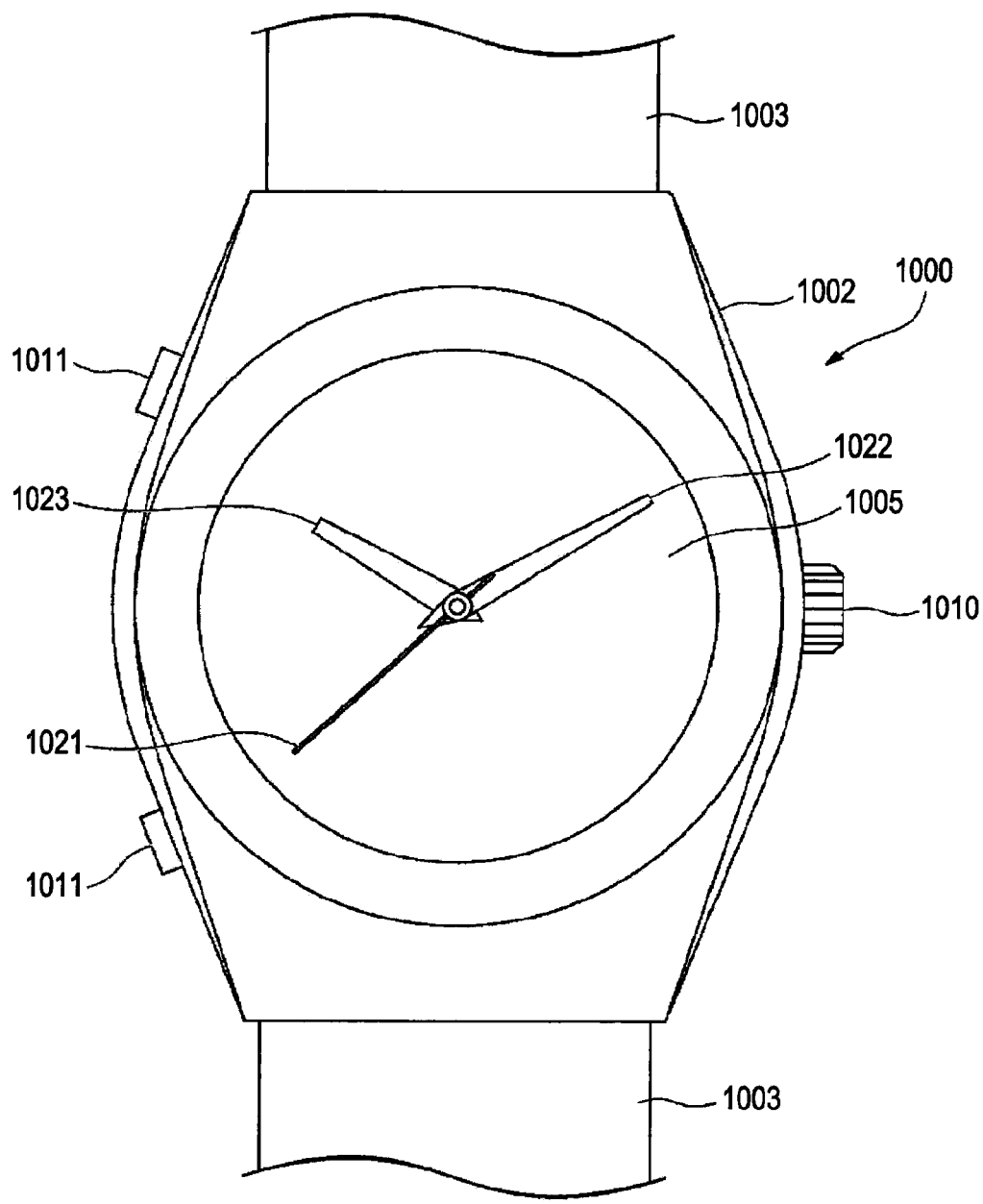
FIG. 10 illustrates an example of an electronic device.

FIG. 10 is a front view illustrating a wristwatch 1000. The wristwatch 1000 includes a watch casing 1002 and a pair of bands 1003 connected to the watch casing 1002.

The front face of the watch casing 1002 is provided with a display unit 1005 made of the electrophoretic display apparatus 100 or 200 according to the first or second embodiment of the invention, a second hand 1021, a minute hand 1022, and an hour hand 1023. The lateral face of the watch casing 1002 is provided with a manipulation button 1011 and a crown 1010 as a manipulator. The crown 1010 is connected to and integrated with a winder pin (not shown) installed inside the casing so as to be freely pressed and drawn in multiple stages (e.g., two stages) and freely rotated. The display unit 1005 may display a background image, character strings such as date or time, a second hand, a minute hand, and an hour hand, or the like.

Electronic Paper

Figure 11:
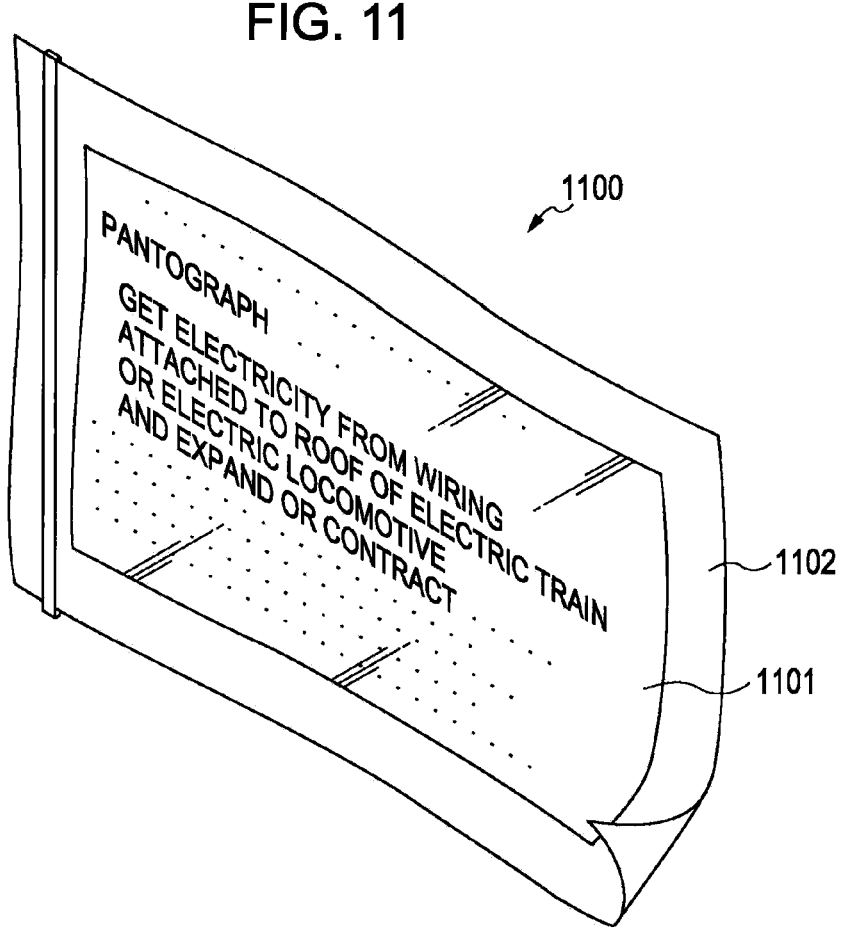
FIG. 11 illustrates an example of an electronic device.

FIG. 11 is a perspective view illustrating an electronic paper 1100. The electronic paper 1100 is equipped with the electrophoretic display apparatus 100 or 200 of the aforementioned embodiments in a display area 1101. The electronic paper 1100 is flexible and includes a mainframe 1102 made of a rewritable sheet having texture and ductility like typical paper.

Figure 12:
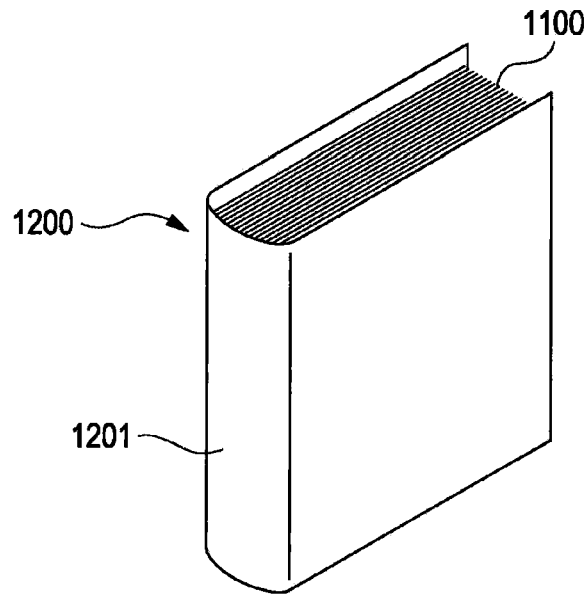
FIG. 12 illustrates an example of an electronic device.

FIG. 12 is a perspective view illustrating an electronic notebook 1200. In the electronic notebook 1200, a plurality of pieces of electronic paper 1100 are bound together and interposed with a cover 1201. The cover 1201 includes, for example, a display data input unit (not shown) for inputting display data transmitted from an external device. As a result, display contents can be modified or updated in response to the display data whilst some pieces of electronic paper remain to be bound together.

Since the aforementioned wristwatch 1000, electronic paper 1100, and electronic notebook 1200 employ an electrophoretic display apparatus 100 or 200 according to the first and second embodiments of the invention as a display unit, they can be considered as electronic devices including a display unit having an excellent power-saving capability.

In addition, the aforementioned electronic device is intended to exemplify an electronic device according to the invention but is not intended to limit the technical scope of the invention. For example, the electrophoretic display apparatus according to the invention can be appropriately adopted in a display unit for other electronic devices such as mobile phones or mobile audio devices.

Pen Input Device

Figure 13:
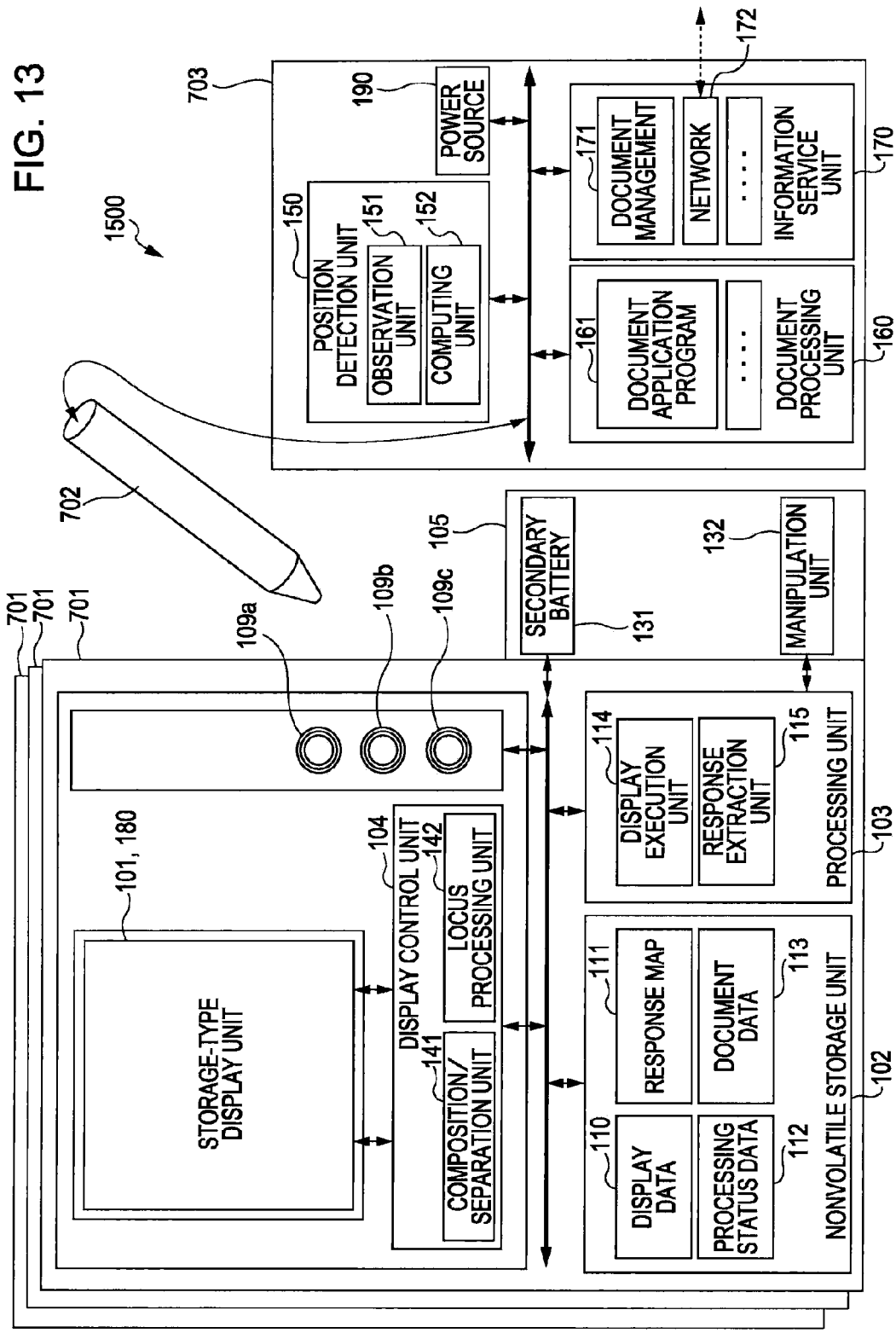
FIG. 13 illustrates a construction of an information processing system according to another embodiment of the invention.

FIG. 13 illustrates an information processing system according to an embodiment of the invention.

The electrophoretic display apparatus according to the first and second embodiments of the invention may also be well suited for a display unit of an information processing system 1500 including a pen input device (or coordinate input device) shown in FIG. 13.

The information processing system 1500 includes a host device 703 having a pen 702 as a pointing device (i.e., a manipulation device) and a client device 701 used to display and manipulate processing results of the host device 703.

The host device 703 and the client device 701 are connected in response to manipulation from the manipulation device (e.g., pen 702 and manipulation buttons). The host device 703 is an event drive type information processing device in which a predetermined process is executed based on the event generated in response to pen manipulation for the client device 701.

In addition, a plurality of client devices 701 may be switched and connected to a single host device 703.

The host device 703 and the client device 701 include a communication unit for transmitting/receiving signals to/from each other.

According to the present embodiment of the invention, the communication unit of the client device 701 includes manipulation buttons 109a to 109c and a processing unit 103 connected to the manipulation buttons 109a to 109c. Meanwhile, the communication unit of the host device 703 includes a pen 702 connected to the host device 703 by wire or wirelessly.

When the pen 702 touches, for example, the manipulation button 109a, predetermined communication information is exchanged between the processing unit 103 of the client device 701 and the document processing unit 160 of the host device 703.

While communication is initiated between the client device 701 and the host device 703 when the pen 702 makes contact (or touch) with the manipulation buttons 109a to 109c according to the present embodiment of the invention, the communication may be initiated in response to various types of operations other than the touch. For example, communication may be initiated when the pen 702 approaches any one of the manipulation buttons 109a to 109c without touching the pen 702.

The client device 701 and the host device 703 may be connected to each other by wire or wirelessly without using the manipulation buttons 109a to 109c and the pen 702. In the case of wireless connection, the client device 701 and the host device 703 may be connected via a relay station. In this case, since the client device 701 and the host device 703 can be communicated continuously, it is unnecessary to prepare a communication unit in the pen 702 or the manipulation buttons 109a to 109c.

Client Device

The client device 701 includes a storage-type display unit 101, a nonvolatile storage unit 102, a processing unit 103, a display control unit 104, and an interface unit 105. The storage-type display unit 101 has a touch panel 180.

The client device 701 has an image display function for displaying an image based on the display data to the storage-type display unit 101 and a pen input function for displaying a locus on the storage-type display unit 101 when the pen 702 or another pointing device touches the storage-type display unit 101 (or touch panel 180).

The storage-type display unit 101 includes the electrophoretic display apparatus 200 according to the first or second embodiment of the invention and a touch panel 180 (refer to FIG. 14) installed on the front face of the electrophoretic display apparatus 200. Therefore, the storage-type display unit 101 functions as an image display device and a coordinate input device in the client device 701.

The storage-type display unit 101 is connected to the system bus of the client device 701 via the display control unit 104. The display control unit 104 is connected to the controller 163 (refer to FIG. 5) of the electrophoretic display apparatus 200 to transmit image data to the controller 163.

Figure 14:
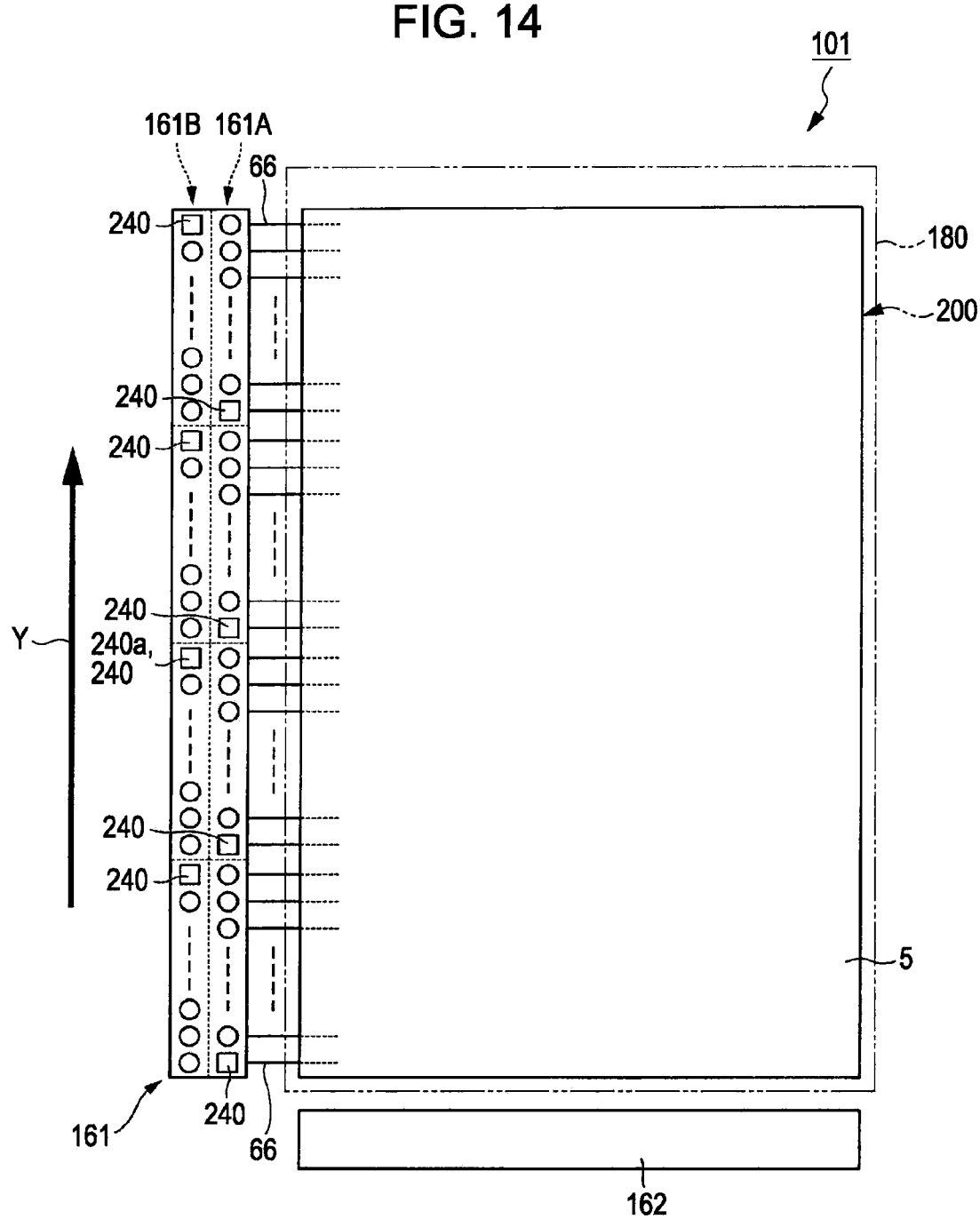
FIG. 14 illustrates a construction of a storage-type display unit according to an embodiment of the invention.

FIG. 14 illustrates a schematic construction of the storage-type display unit 101 applied to the client device 701 according to an embodiment of the invention.

Referring to FIG. 14, a touch panel 180 is installed on the display unit 5 of the electrophoretic display apparatus 200. The scanning line driving circuit 161 and the data line driving circuit 162 are connected to the display unit 5 of the electrophoretic display apparatus 200.

According to the present embodiment of the invention, the scanning line driving circuit 161 includes two circuit element chains 161A and 161B extending vertically in the drawing, and a plurality of start pulse input terminals 240 are provided in each of the circuit element chains 161A and 161B. The start pulse input terminal 240 is supplied with a start pulse for sequentially initiating the selection operation for the scanning line driving circuit 161 from the controller 163.

In this construction, the scanning line driving circuit 161 is constructed to sequentially and bilaterally select the scanning lines 66 arranged along a Y-direction in the drawing. Specifically, when the start pulse is input to the start pulse input terminal 240 of the circuit element chain 161A, the scanning line driving circuit 161 sequentially selects the scanning lines 66 in a forward direction (i.e., from the bottom to the top in a Y-direction in FIG. 13). Meanwhile, when the start pulse is input to the start pulse input terminal 240 of the circuit element chain 161B, the scanning line driving circuit 161 sequentially selects the scanning lines 66 in a reversed direction (i.e., reversed to the Y-direction in the drawing).

According to the present embodiment of the invention, four start pulse input terminals 240 belonging to the circuit element chain 161A are disposed in the lower ends of each subsection supposing that the circuit element chain 161A is divided into four subsections in the arrangement direction of the scanning lines 66. Meanwhile, four start pulse input terminals 240 belonging to the circuit element chain 161B are disposed in the upper ends of each subsection supposing that the circuit element chain 161B is divided into four subsections. However, the start pulse input terminals 240 may be disposed in an arbitrary location.

The start pulse can be selectively input to a plurality of the start pulse input terminals 240, and the scanning lines 66 are sequentially selected starting from the start pulse input terminal 240 to which the start pulse is input. For example, when the start pulse is input to the start pulse input terminal 240a located in nearly the center of the circuit element chain 161B, a selection operation is sequentially executed from the scanning line 66 corresponding to this start pulse input terminal 240a in a reversed direction (i.e., the data line driving circuit 162 side; reversed to the arrow direction Y).

The touch panel 180 installed in the display unit 5 of the electrophoretic display apparatus 200 corresponds to a position detection unit (or coordinate input device) of the client device 701 to detect information regarding indicated position on the display unit 5 by detecting touch or approach of the pointing device such as a pen 702 (i.e., location information of the touch point).

As will be described later in detail, the position information detected by the touch panel 180 is transmitted to the display control unit 104. The display control unit 104 displays a locus of the touch on the storage-type display unit 101 based on the received position information.

Various types of touch panels 180 may be selectively employed based on the detection accuracy, size, cost, weight, or the like. For example, a resistive film type configured to detect a variation of resistance generated by conduction at a point touched by an operator or an electrostatic capacitance type configured to detect a variation of electrostatic capacitance generated by a finger touch of an operator may be employed. Alternatively, an ultrasonic surface elastic wave type or an infrared light shielding type configured to detect the point designated by the operator by detecting a variation of an ultrasonic wave or infrared light generated by touch or approach of the pen 702 on the touch panel 180 may also be employed.

The touch panel 180 may not be disposed immediately on the display unit 5 if it can detect the coordinates in synchronization with the display unit 5. For example, the touch panel 180 may be disposed around the display unit 5, and the coordinates on the display unit 5 may be designated by performing an input manipulation onto the touch panel 180.

Returning to FIG. 13, manipulation buttons 109a to 109c are provided in the vicinity of the storage-type display unit 101 of the client device 701. Manipulation of an operator for the client device 701 may be allocated to the manipulation buttons 109a to 109c. For example, manipulation such as rewriting of the screen displayed on the storage-type display unit 101 (such as next page, previous page, and start page) may be allocated.

The manipulation buttons 109a to 109c may functions as a communication interface between the client device 701 and the host device 703 in combination with the pen 702 of the host device 703. According to the present embodiment of the invention, the manipulation buttons 109a to 109c are provided with an optical communication module having an infrared ray receiver/transmitter. Meanwhile, the pen 702 includes an infrared irradiator which irradiates infrared rays, an infrared ray receiver which receives the reflection light of the irradiated infrared rays, and an image pickup optical system which focuses the reflection light on the infrared ray receiver.

As a local communication method between the manipulation buttons 109a to 109c and the pen 702, electromagnetic waves or electromagnetic induction may be used in addition to the optical method such as using the infrared rays.

The manipulation buttons 109a to 109c and the pen 702 are provided with a device for supplying the optical communication module with power. Specifically, the manipulation buttons 109a to 109c and the pen 702 are provided with coils so that both antenna coils are electronically combined to supply power from the host device 703 to the client device 701 via the pen 702 when the pen 702 makes contact with the manipulation buttons 109a to 109c.

As a result, the optical communication modules of the manipulation buttons 109a to 109c, the infrared ray irradiator and the infrared ray receiver of the pen 702 are allowed to perform communication. The processing unit 103 of the client device 701 generates a signal for specifying which manipulation button is touched and transmits communication information corresponding to this signal to the host device 703 via the pen 702.

According to the present embodiment of the invention, since infrared rays are used to input or output information between the client device 701 and the host device 703, it is possible to reduce power consumption and provide high-speed (e.g., 16 Mbps) communication in comparison with the electromagnetic induction type. It is also possible to prevent influence on communication that may be generated when feeding the client device 701 using an electronic coupling.

The nonvolatile storage unit 102 is a storage device for storing data regarding contents to be displayed on the storage-type display unit 101, commands for controlling operation, parameters, or the like. The nonvolatile storage unit 102 may be constructed of, for example, EEPROM (Electrically-Erasable and Programmable Read-Only Memory) or flash memory.

The nonvolatile storage unit 102 stores display data 110, a response map 111, processing status data 112, and document data 113, but may store other data or parameters.

The display data 110 are data regarding display images generated by the host device 703 based on the document data 113. The display data 110 are input to the storage-type display unit 101 from the host device 703 via the display control unit 104 and displayed on the storage-type display unit 101.

The processing status data 112 are data recording a processing method or a processing history of the host device 703 for the document data 105. The processing status data 112 may include processing context information to be referred to when data are continuously processed.

The response map 111 is a map representing commands corresponding to manipulation buttons 109a to 109c, or document or a dialog elements (such as character strings, images, link information, and execution instructions) displayed in each of the coordinates of the storage-type display unit 101.

The response map 111 allows the client device 701 to obtain responses to be executed according to manipulation and instruct the host device 703 to execute the responses.

The response map 111 contains two kinds of response maps, a response map regarding predetermined instructions allocated to the manipulation buttons 109a to 109c and a response map regarding extraction of the document elements. The response map regarding a predetermined instruction is used to instruct to execute a predetermined operation, whereas the response map regarding extraction of the document elements is used to extract document or dialog elements (such as character string, images, link information, and execution instructions) allocated to each coordinate location of the storage-type display unit 101.

The processing unit 103 includes a display execution unit 114 and a response extraction unit 115.

The display execution unit 114 controls the storage-type display unit 101 in response to update of the display data 110 stored in the nonvolatile storage unit 102 to input the display data 110 updated to the storage-type display unit 101 and display the display data 110.

The response extraction unit 115 obtains data regarding commands or document or dialog elements displayed on the storage-type display unit 101 by identifying which any one of manipulation buttons 109a to 109c is manipulated or comparing the coordinates of the point (or position information) touched by the pen 702 with the response map 111. The obtained data are output to the document processing unit 160 of the host device 703 via the pen 702 or the manipulation buttons 109a to 109c.

The display control unit 104 includes a locus processing unit 142 (corresponding to an image drawing unit in the client side) used to draw an image based on the position information detected by the touch panel 180 and a composition/separation unit 141 (corresponding to an image composition unit in the client side) used to overlappingly display the image drawn by the locus processing unit 142 and the image based on the display data 110.

The locus processing unit 142 generates an image obtained by modifying the pixel of the storage-type display unit 101 corresponding to a touch point detected by the touch panel 180 to have a drawing color. That is, the locus processing unit 142 generates an image obtained by drawing the locus of the touch pen 180 on the storage-type display unit 101. The generated image (i.e., a line drawing) is managed by the display control unit 104 as an image of a different layer from that of the display data 110 of the nonvolatile storage unit 102.

The composition/separation unit 141 generates an image by overlapping the line-drawing layer image generated by the locus processing unit 142 and the display data 110 layer image input from the host device 703. The generated composition image is transmitted to the storage-type display unit 101 and displayed on the storage-type display unit 101. By overlappingly displaying the line-drawing layer image and the display data 110 layer image, it is possible to allow an operator to get a manipulation feeling like adding markers or comments on the display data 110.

The composition/separation unit 141 may separate the line-drawing layer image or the display data 110 layer image from the composition image by omitting any one of the line-drawing layer image and the display data 110 layer image when the layer image based on the display data 110 and the line-drawing layer image are overlappingly displayed.

The locus processing unit 142 may store correction information for adjusting positions between the touch panel 180 and the storage-type display unit 101. As a result, it is possible to more accurately display the locus of the pen 702 on the storage-type display unit 101.

It is preferable that the composition/separation unit 141 has a function to delete the line-drawing layer image (through initialization). For example, if the locus is determined after completing inputting a continuous locus, and then, the composition image is confirmed by the host device 703, it is preferable to clear the line drawing formed by the locus processing unit 142.

The locus processing unit 142 is not limited to drawing a line based on the position detected by the touch panel 180, but may draw other images such as a pointer. In this construction, it is possible to increase the manipulation capability of the information processing system because the operator's view position or the command execution range can be rapidly indicated even in the electronic paper.

According to the present embodiment of the invention, the host device 703 also detects the touch position and stores the result thereof when any position is touched by the pen 702 on the storage-type display unit 101. Detection of the touch position is executed by previously setting the coordinate patterns (position information codes) in the storage-type display unit 101 and reading the coordinate patterns using the pen 702. That is, when the pen 702 touches the storage-type display unit 101, the infrared ray irradiator of the pen 702 irradiates the storage-type display unit 101, and the infrared ray receiver installed in the pen 702 optically reads the coordinate pattern. The read coordinate pattern is input to a position detection unit 150 of the host device 703 so that information regarding the touch position is also stored in the host device 703.

The interface unit 105 includes a secondary battery 131 and a manipulation unit 132. The secondary battery 131 is used to supply power to each of the aforementioned components. The manipulation unit 132 is a user interface for directly inputting instructions to the client device 701 without using the host device 703 and includes a manipulation button, a slide switch, or the like.

Host Device

The host device 703 includes a position detection unit 150, a document processing unit 160, an information service unit 170, and a power source 190.

The position detection unit 150 has an observation unit 151 and a computing unit 152. The observation unit 151 detects a coordinate pattern of the point touched by the pen 702 based on light-receiving results of the infrared ray receiver transmitted from the pen 702. The detected coordinate pattern is output to the computing unit 152. The computing unit 152 performs computation such as decoding an information figure for the coordinate pattern to specify the coordinates of the touch point, and outputs it to the document processing unit 160.

The document processing unit 160 is a central controller for controlling the entire information processing system. The document processing unit 160 has a document application program 161. The document application program 161 is used to determine instruction contents, and reads and executes a processing routine corresponding to the instruction contents.

The document processing unit 160 reads and executes processing routines corresponding to the instructions that are previously stored, according to various processing instructions obtained using the pen 702 and the manipulation buttons 109a to 109c by executing the document application program 161. As a specific processing routine, display data 110 are generated, and the generated display data 110 are transmitted to the client device 701 via the pen 702 and the manipulation buttons 109a to 109c.

More specifically, for example, when an instruction to display the next page (i.e., page turn-over) for the image being displayed on the storage-type display unit 101 is generated, the document application program 161 obtains processing status data 112 regarding the page being displayed at that moment on the storage-type display unit 101 and document data 113 from the nonvolatile storage unit 102 via the pen 702 and the manipulation buttons 109a to 109c. Then, a layout processing for the next page is executed based on the processing status data 112 and the document data 113 to generate the display data 110 and the response map 111 for the next page. Then, the generated display data 110 and the response map 111 are transmitted to the client device 701 via the pen 702 and the manipulation buttons 109a to 109c to store them in the nonvolatile storage unit 102.

The document processing unit 160 also processes the coordinates of the touch point obtained from the position detection unit 150 in response to the processing instruction of the document application program 161. For example, a process for adding a locus corresponding to the touch point to the document data 113 is executed. In this case, the document processing unit 160 accumulates in temporary memory the coordinates of the touch point sequentially obtained via the pen 702 and waiting for the instructional manipulation from an operator. If an operator draws a series of loci whilst looking at the composition image on the client device 701 and then touches one of the manipulation buttons 109a to 109c corresponding to the confirmed manipulation reflecting the loci, the host device 703 determines that the corresponding manipulation is executed. Accordingly, a corresponding document application program 161 is called, and a data string regarding the coordinates of the loci accumulated in the temporary memory is processed. At this moment, the document processing unit 160 generates, for example, display data 110 results by adding the locus corresponding to the touch point based on the instruction from the document application program 161 and transmits the display data 110 to the client device 701.

In the aforementioned construction, the document processing unit 160 functions as a host side image drawing element for drawing a locus image including the locus of the pen 702, a host side image composition element for generating a composition image obtained by composing the drawn locus image and the display image based on the image data, and a display control element for displaying the generated composition image on the storage-type display unit 101 instead of the layer image generated by the client device 701.

The information service unit 170 includes a document management unit 171 which manages document data that can be transmitted to the client device 701 and a network communication unit 172 connected to other network resources. The document management unit 171 is a storage unit for storing a plurality of document data 113, and the network communication unit 172 is to provide network communication by wire or wirelessly.

In the information processing system 1500 according to the present embodiment of the invention described above, since the client device 701 has a function of generating a layer image corresponding to the touch of the pen 702 and rapidly displaying the locus, it is possible to provide an operator with an excellent manipulation capability.

In addition, the host device 703 generates the composition image obtained by overlapping the locus of the pen 702 with the display data 110 and displays the composition image on the storage-type display unit 101. The composition image generated from the host device 703 has a higher display quality in comparison with the layer image generated from the client device 701. Therefore, it is possible to provide both the excellent manipulation capability and the high display quality by using the composition image generated from the host device 703 in combination with the layer image of the pen locus rapidly displayed by a single client device 701.

Furthermore, the host device 703 can generate a higher-quality composition image because the processing unit 103 or the display control unit 104 of the client device 701 which requires portability and reductions in size or weight are necessary, but the host device 703 is able to load the image processing circuit having better performance as size and weight reductions are not necessary.

Driving Method

Subsequently, a driving method will be described in a case where touch input is executed on the storage-type display unit 101 of the client device 701 in the information processing system 1500 according to an embodiment of the invention.

Figure 15:
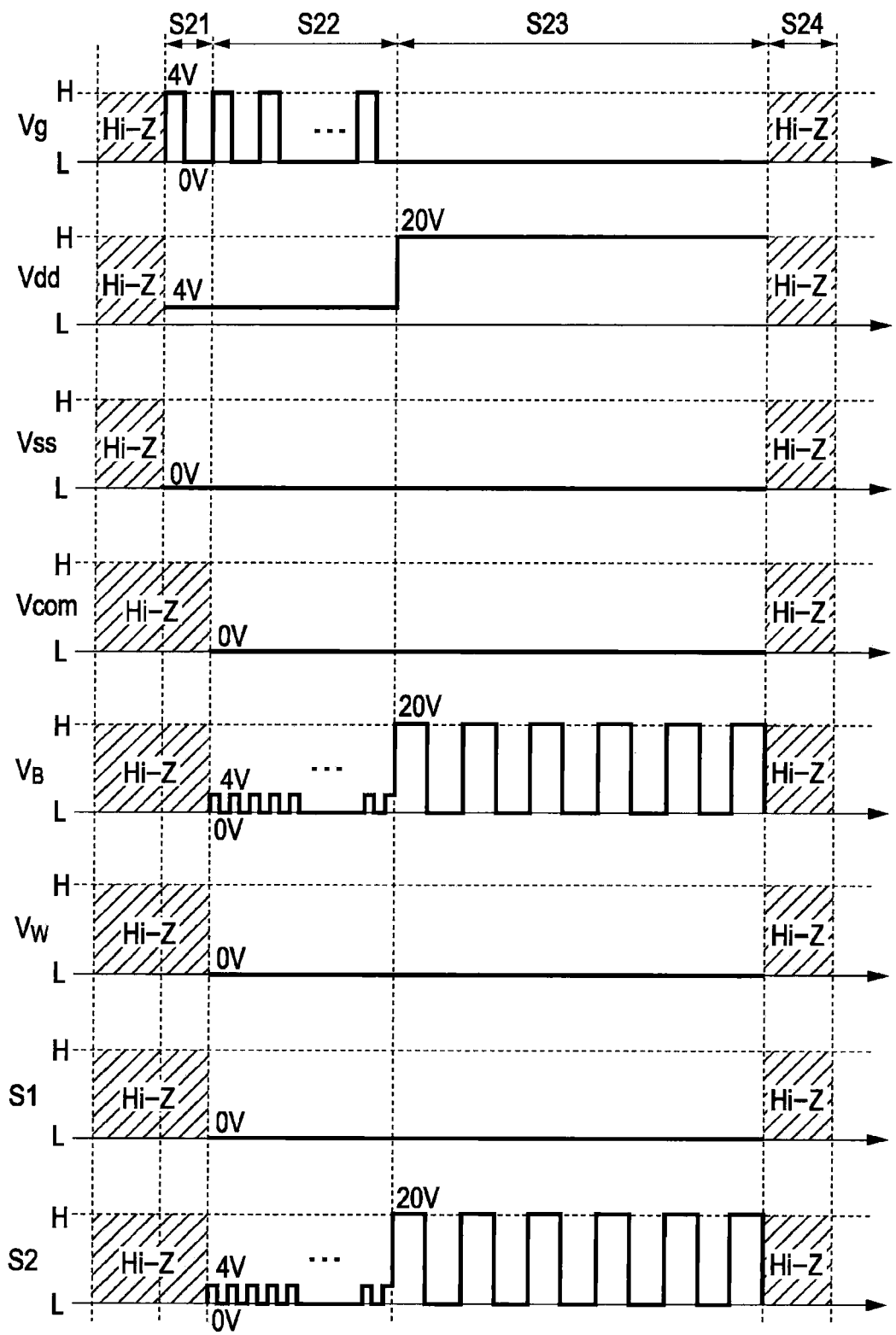
FIG. 15 is a timing chart illustrating a driving of a storage-type display unit according to another embodiment of the invention.

FIG. 15 is a timing chart illustrating an electrophoretic display apparatus 200 in a case where a locus of a pointing device is displayed on the electrophoretic display apparatus 200 in response to touch input on the touch panel 180.

In order to allow the client device 701 to display the locus of the pointing device on the electrophoretic display apparatus 200, the image signals stored in the latch circuit 70 for all the pixels 140 are reset in the step S21 as shown in FIG. 15.

Specifically, the display data 110 including only pixel data "0" are supplied to the electrophoretic display apparatus 200 of the storage-type display unit 101 from the composition/separation unit 141 of the display control unit 104. Then, a scanning signal having a high level (e.g., 4 V) is sequentially input to the scanning lines 66 from the scanning line driving circuit 161 in the electrophoretic display apparatus 200, and an image signal having a low level (e.g. 0 V) is input to the data lines 68 from the data line driving circuit 162. As a result, an image signal having a low level (e.g., 0 V) is stored in the latch circuits 70 of all the pixels 140 of the display unit 5.

Through this operation, in all the pixels 140 of the display unit 5, the first transmission gate TG1 is turned on, so that the first control line 91 and the pixel electrode 35 are electrically connected. However, in step S21, both the first control line 91 and the common electrode 37 have a high impedance state (Hi-Z). Therefore, there is no change in the actual display state.

In step S22, a low level (e.g., 0 V) is input to the common electrode 37. A low level (e.g., 0 V) is input to the first control line 91. A rectangular wave periodically alternating between high and low levels (e.g., 4 V and 0 V) is input to the second control line 92. During the period of step S22, the selection operation of the scanning line 66 is repetitively executed, and the composition image modified in response to the touch input is sequentially transmitted to the display unit 5. As a result, the touch input generated by the pointing device (such as a pen 702) to the touch panel 180 is reflected on the display.

The period of step S22 in which the touch input generated by the pointing device such as a pen 702 is effective is preferably set to, for example, a length of about 20 to 30 frames.

An operation for reflecting the touch input on the display is executed as follows.

In the client device 701, the touch panel 180 detects whether the pointing device such as a pen 702 is touched and outputs to the display control unit 104 the coordinate data (or position information) representing the coordinates of the touch position (or touch point).

If the position information of the touch point is input, the locus processing unit 142 of the display control unit 104 executes drawing for changing the pixel corresponding to the touch point to the drawing color (corresponding to the pixel data "1") and generates the layer image corresponding to the locus of the touch input. Then, the composition/separation unit 141 combines the generated layer image (i.e., the image of the locus generated by the touch input) with the layer image of the display data 110 (e.g., the background image containing only pixel data "0"). Then, the generated composition image is input to the electrophoretic display apparatus 200.

In the electrophoretic display apparatus 200, since the image data is repetitively transmitted to the display unit 5 during the period of step S22, the composition images are sequentially transmitted to the display unit 5 whenever input to the electrophoretic display apparatus 200.

As a result, a high level (e.g., 4 V) corresponding to pixel data "1" is input to the pixels 140 corresponding to the locus of the touch input. A low level (e.g., 0 V) corresponding to pixel data "0" is input to other pixels 140.

In the pixels 140 receiving a high level of the image signal, the second transmission gate TG2 is turned on, and the second control line 92 is electrically connected to the pixel electrode 35. Accordingly, a rectangular wave periodically alternating between high and low levels (e.g., 4 V and 0 V) is input to the pixel electrode 35 (shown as a potential $V_B$ in FIG. 15) of the pixel 140 (in the pixel electrode pulse driving mode).

As a result, the electrophoretic element 32 is driven by the potential difference generated between the common electrode 37 (having a low level) and the pixel electrode 35 whilst the pixel electrode 35 has a high level, so that the pixel 140 corresponding to the locus of the touch input is changed to display a black color.

In addition, in the pixel 140 to which the pixel data "0" is input, the pixel electrode 35 is changed to have a potential of the first control line 91 (having a low level). Since the potential is not different from that of the common electrode 37 (having a low level), a display state is not updated.

Therefore, through the aforementioned operations, the locus of the touch input is added to the image that has been previously displayed on the display unit 5, and the image including the added touch input path is displayed.

According to the present embodiment of the invention, as shown in FIG. 14, since the scanning line driving circuit 161 can perform the scanning operation in a bilateral direction, the client device 701 detects which one of two scanning line 66 arrangement directions (up or down direction in FIG. 14) corresponds to the movement direction of the touch point (a direction that the locus extends) based on a variation of the position information input to the display control unit 104. The display control unit 104 determines a selection start position (i.e., a position where the start pulse is to be input) for selecting the scanning line 66 by the scanning line driving circuit 161 based on the coordinates and the movement direction of the touch point and transmits it to the electrophoretic display apparatus 200.

Figure 16:
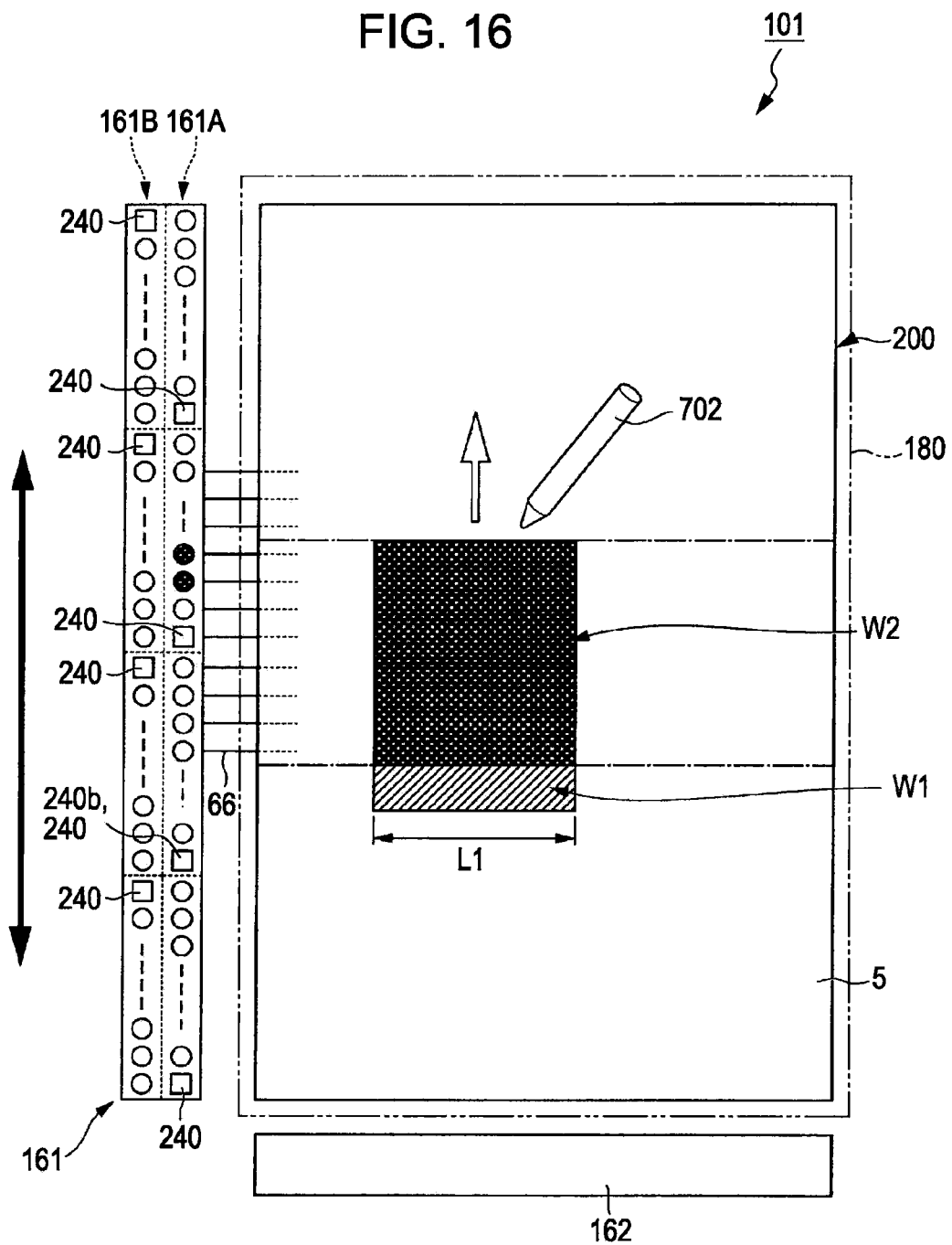
FIG. 16 illustrates appearance of driving a storage-type display unit according to an embodiment of the invention.

For example, as shown in FIG. 16, when the pen 702 is moved upwardly on the touch panel 180 in the drawing, the scanning line driving circuit 161 sequentially selects the scanning lines 66 from the lowermost one to the uppermost one to input the scanning signal. Through this operation, the display image of the display unit 5 is updated along a direction that the touch area W2 is moved by the pen 702.

More specifically, among four start pulse input terminals 240 belonging to the circuit element chain 161A shown in the right side in the drawing, the start pulse is input to the one which is most adjacent to the touch area W2 which is the initial touch point on the touch panel 180 and also located in an upper region in the movement direction with respect to the touch area W2. In the example shown in FIG. 16, the start pulse is input to the second one of the start pulse input terminals 240b from the bottom. As a result, it is possible to rapidly update the display of the area where the locus of the touch input is to be displayed on the display unit 5. It is possible to reduce the time lag from the touch input.

In the example shown in FIG. 16, when the image data are transmitted in step S22, a plurality of scanning lines 66 (e.g., eight lines in the drawing) are simultaneously selected to input the image signal such that the length of the touch area W2 in a scanning line 66 arrangement direction corresponds to the width L1 of the touch area W2 in a horizontal direction (i.e., the scanning line 66 extending direction). Such a driving method in which a plurality of scanning lines 66 are simultaneously selected can be readily implemented by changing the pulse width of the start pulse input to the start pulse input terminal 240 (or consecutively inputting a plurality of start pulses).

Subsequently, in step S23 shown in FIG. 14, the potential Vdd of the high-potential power line 50 is raised from 4 V to 20 V. Accordingly, in the pixel 140 corresponding to the locus of the touch input, a high-level potential input to the pixel electrode 35 is raised to 20 V. As a result, since the electrophoretic element 32 is driven by 20 V, a contrast of the line drawing corresponding to the locus of the touch input increases.

Subsequently, in step S24, since each wiring connected to the pixels 140 has a high impedance state, the displayed image is maintained without consuming power. The process may be returned to step S21 without executing step S24 in order to receive the touch input again.

Figure 17:
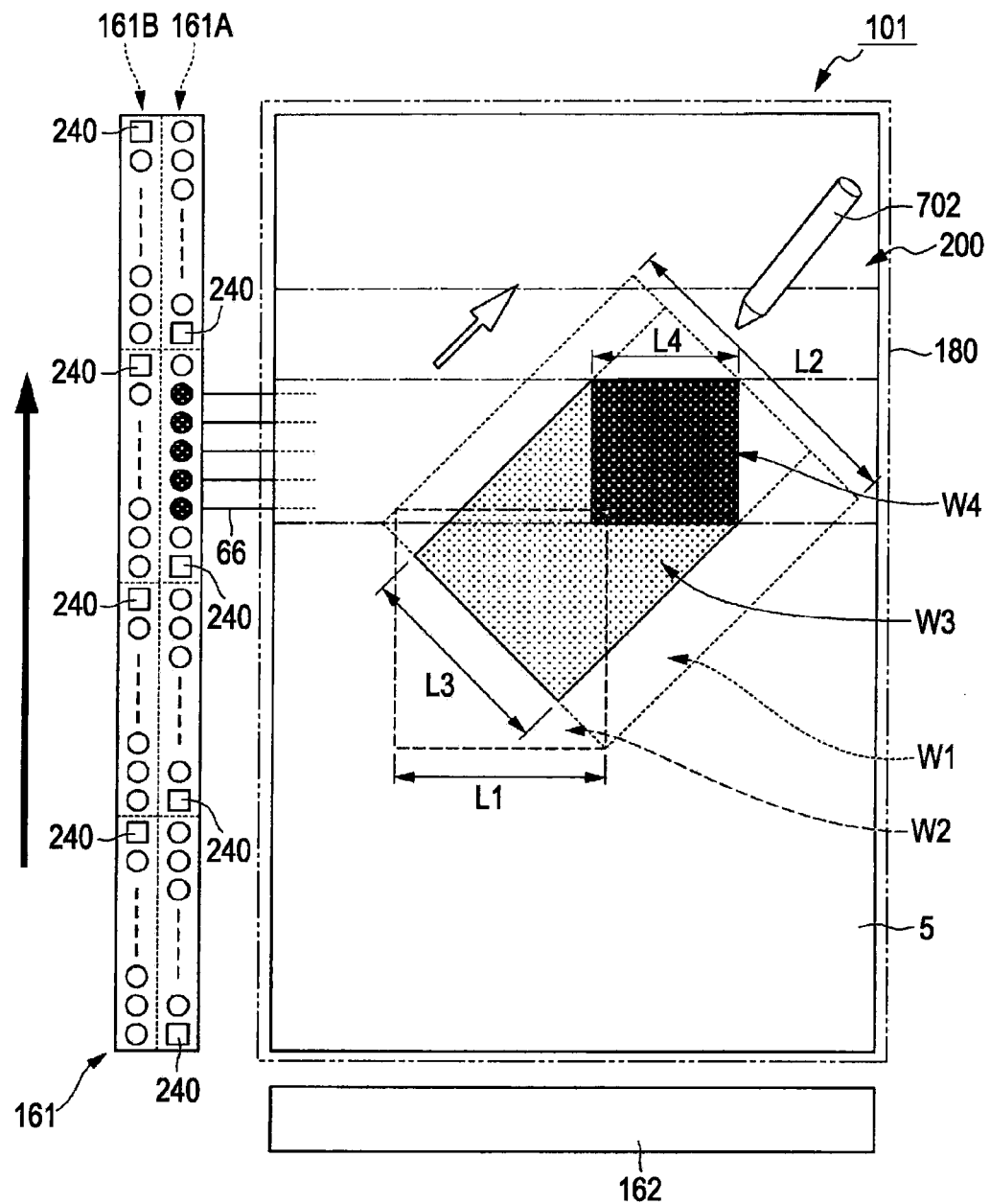
FIG. 17 illustrates appearance of driving a storage-type display unit according to an embodiment of the invention.

In the aforementioned descriptions, the pointing device such as a pen 702 is operated in a vertical direction (i.e., the scanning line 66 arrangement direction) in FIG. 16. However, even when the pointing device such as a pen 702 moves in an inclined direction on the touch panel 180 as shown in FIG. 17, the scanning lines 66 are sequentially selected from the lowermost one to the uppermost one in the drawing similar to the aforementioned embodiment. In this case, supposing that the touch area W2 having the same size as that of FIG. 16 is moved, the width L2 of the line (the image W1) extended in an inclined direction is larger than the width L1 of the touch area W2 in the horizontal direction (the width along the direction that the scanning lines 66 are extended) as shown in FIG. 17. Therefore, a locus having a different line width is displayed due to the movement direction of the touch input.

In this case, when the touch input is moved in an inclined direction with respect to the scanning line 66 arrangement direction, the size (i.e., the number of scanning lines 66 simultaneously selected) is adjusted depending on the movement direction so that display is executed using a touch area W4 having a reduced size. The touch area W4 is set such that the line width L3 of the locus (i.e., the image W3) when the touch input is moved in an inclined direction is equal to the width L1 of the touch area W2 in a horizontal direction. That is, the touch area W4 is set such that the width L4 in a horizontal direction thereof (i.e., the scanning line 66 extending direction) becomes L4=L1×(L3/L2). The number of scanning lines 66 simultaneously selected is also reduced to the number corresponding to the width L4. In the example shown in FIG. 17, by reducing the number of scanning lines 66 simultaneously selected from eight to five, it is possible to equalize the width of the image W3 representing the line extending in an inclined direction with the width of the image W1 representing the line extending in a vertical direction.

When the touch position (or touch area) is moved on the touch panel 180, for example, a plurality of coordinate data regarding the touch positions may be stored in a buffer (not shown), and a single layer image (i.e., the image of the locus of the touch input) may be generated based on a plurality of the coordinate data. In this case, the image signal is collectively supplied to a plurality of data lines 68. If this driving method is combined with the aforementioned example in which a plurality of scanning lines 66 are simultaneously selected, a plurality of lines can be rewritten in a single scanning for left, right, top and bottom ranges. Therefore, it is possible to significantly reduce the rewriting time lag and more real-timely rewrite the display. The number of the data lines 68 to which the image signal is simultaneously input may be equal to the number of the scanning lines 66 to which the scanning signal is simultaneously supplied or set to another number.

As described above, in the information processing system 1500 according to the present embodiment of the invention, when the locus of the touch input with respect to the touch panel 180 is displayed on the storage-type display unit 101, a rectangular wave alternating between high and low levels is input to the pixel electrode 35 of the display unit 5. As a result, only the pixels 140 of which display states are changed (i.e., the pixels corresponding to the locus of the touch input) are driven to execute display, and the display states of other pixels 140 are maintained without consuming power.

When the locus of the pointing device such as a pen 702 is displayed, the area to be updated is only a part of the display unit 5. As a result, it is possible to effectively reduce power consumption by displaying the locus using the pixel electrode pulse driving mode capable of driving only the pixels 140 of which display states are updated.

According to the aforementioned embodiments of the invention, a low level is input to the latch circuits 70 of all the pixels 140 in step S21, a high level is input to the latch circuits 70 of the pixels 140 corresponding to the locus of the touch input in step S22, and a rectangular wave periodically alternating between high and low levels is input to the second control line 92. However, the invention is not limited to such a driving method.

For example, a high level may be input to the latch circuits 70 of all the pixels 140 in step S21, a low level may be input to the latch circuits 70 of the pixels 140 corresponding to the locus of the touch input in step S22, and a rectangular wave periodically alternating between high and low levels may be input to the first control line 91.

The entire disclosure of Japanese Patent Application Nos: 2009-026392, filed Feb. 6, 2009 and 2009-198110, filed Aug. 28, 2009 are expressly incorporated by reference herein.

What is claimed is:

1. A method of driving an electrophoretic display apparatus, the electrophoretic display apparatus including:
    a display unit having a plurality of pixels;
    a plurality of pixel electrodes, each of the plurality of pixel electrodes corresponding to one of the plurality of pixels;
    a common electrode facing the plurality of pixel electrodes; and
    an electrophoretic element disposed between the plurality of pixel electrodes and the common electrode, the electrophoretic element having electrophoretic particles,
    the method comprising:
    selecting one of a pixel electrode pulse driving or a common electrode pulse driving for displaying an image on the display unit based on a ratio of the pixels that are going to be updated by selected pulse;

executing the pixel electrode pulse driving in response to the pixel electrode pulse driving being selected for displaying the image on the display unit, the pixel electrode pulse driving including:
applying a pulse periodically alternating between a first and second potential to the pixel electrode belonging to the pixel of which a display state is changed,
maintaining application of a constant potential to the pixel electrode belonging to the pixel of which a display state is not to be changed, and
applying the constant potential to the common electrode; and
executing the common electrode pulse driving in response to the common electrode pulse driving being selected for displaying the image on the display unit, the common electrode pulse driving including:
applying the first or second potential corresponding to a display color after updating to each of the plurality of pixel electrodes, and
applying a pulse periodically alternating between the first and second potentials to the common electrode.

2. The method according to claim 1, wherein the pixel electrode pulse driving is selected when the ratio of the pixels of which display states are updated is 50% or less of all the pixels.

3. The method according to claim 2, wherein the electrophoretic display apparatus includes a coordinate input device for executing input by a pointing device, and the pixel electrode pulse driving is selected when a locus of the pointing device is displayed.

4. The method according to claim 1, wherein the common electrode pulse driving is executed only when the ratio of the pixels of which display states are updated is 100%.

5. The method according to claim 1, wherein first and second control lines connected to each of the plurality of pixels are formed in the display unit, and each of the plurality of pixels includes a pixel switching element, a latch circuit connected to the pixel switching element, and a switch circuit connected to an output terminal of the latch circuit and the first and second control lines, and
wherein in the pixel electrode pulse driving,
a pulse periodically alternating between the first and second potentials is input to the first or second control line connected to the pixel electrode belonging to the pixel of which a display state is changed, and the first or second potential equal to a potential of the common electrode is input to the first or second control line connected to the pixel electrode belonging to the pixel of which a display state is maintained.

6. The method according to claim 1, wherein first and second control lines connected to each of the plurality of pixels are formed in the display unit, and each of the plurality of pixels includes a pixel switching element, a latch circuit connected to the pixel switching element, and a switch circuit connected to two output terminals of the latch circuit and the first and second control lines, and
wherein in the common electrode pulse driving, the first or second potential corresponding to a display color after updating is input to the first and second control lines.

7. An electrophoretic display apparatus comprising:
a display unit having a plurality of pixels;
a plurality of pixel electrodes, each of the plurality of pixel electrodes corresponding to one of the plurality of pixels;
a common electrode facing the plurality of pixel electrodes; and
an electrophoretic element disposed between the plurality of pixel electrodes and the common electrode, the electrophoretic element having electrophoretic particles; and
a control unit that controls potentials input to the plurality of pixel electrodes and the common electrode,
the control unit selects one of a pixel electrode pulse driving or a common electrode pulse driving for displaying an image on the display unit,
in the pixel electrode pulse driving:
a pulse periodically alternating between first and second potentials is input to the pixel electrode belonging to the pixel of which a display state is changed,
a constant potential applied to the pixel electrode belonging to the pixel of which a display state is not to be changed is maintained, and
the constant potential is applied to the common electrode,
in the common electrode pulse driving: the first or second potential corresponding to a display color after updating is input to each of the plurality of pixel electrodes, and a pulse periodically alternating between the first and second potentials is input to the common electrode, and
the control unit selects between the pixel electrode pulse driving and the common electrode pulse driving is selected based on a ratio of the pixels that are going to be updated by the selected pulse.

8. The electrophoretic display apparatus according to claim 7, wherein first and second control lines connected to each of the plurality of pixels are formed in the display unit, and each of the plurality of pixels includes a pixel switching element, a latch circuit connected to the pixel switching element, and a switch circuit connected to two output terminals of the latch circuit and the first and second control lines, and
wherein in the pixel electrode pulse driving of the control unit, a pulse periodically alternating between the first and second potentials is input to the first or second control line connected to the pixel electrode belonging to the pixel of which a display state is changed, and the first or second potential equal to a potential of the common electrode is input to the first or second control line connected to the pixel electrode belonging to the pixel of which a display state is maintained.

9. The electrophoretic display apparatus according to claim 7, wherein first and second control lines connected to each of the plurality of pixels are formed in the display unit, and each of the plurality of pixels includes a pixel switching element, a latch circuit connected to the pixel switching element, and a switch circuit connected to two output terminals of the latch circuit and the first and second control lines, and
wherein in the common electrode pulse driving of the control unit, the first or second potential corresponding to a display color after updating is input to the first and second control lines.

10. The electrophoretic display apparatus according to claim 7, further comprising a coordinate input device for executing an input operation using a pointing device, wherein the control unit is operated to display a locus of the pointing device on the display unit using the pixel electrode pulse driving.

11. An electronic device comprising an electrophoretic display apparatus according to claim 7.

12. A method of driving an electrophoretic display apparatus, the electrophoretic display apparatus including:

a display unit having a plurality of pixels;

a plurality of pixel electrodes, each of the plurality of pixel electrodes corresponding to one of the plurality of pixels;

a common electrode facing the plurality of pixel electrodes; and an electrophoretic element disposed between the plurality of pixel electrodes and the common electrode, the electrophoretic element having electrophoretic particles, the method comprising:

selecting one of a pixel electrode pulse driving or a common electrode pulse driving for displaying an image on the display unit based on a ratio of the pixels that are going to be updated by selected pulse;

executing the pixel electrode pulse driving in response to the pixel electrode pulse driving being selected for displaying the image on the display unit, the pixel electrode pulse driving including:

applying a pulse periodically alternating between a first and second potential to the pixel electrode belonging to the pixel of which a display state is changed, maintaining application of a constant potential applied to the pixel electrode belonging to the pixel of which a display state is not to be changed, and applying the constant potential to the common electrode, and wherein the pixel electrode pulse driving is selected when the ratio of the pixels of which display states are updated is 50% or less of all the pixels.

\* \* \* \* \*